(12) United States Patent
Egawa

(10) Patent No.: US 8,773,552 B2
(45) Date of Patent: Jul. 8, 2014

(54) SOLID STATE IMAGING DEVICE

(75) Inventor: Yoshitaka Egawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 457 days.

(21) Appl. No.: 13/115,391

(22) Filed: May 25, 2011

(65) Prior Publication Data

US 2012/0008028 A1 Jan. 12, 2012

(30) Foreign Application Priority Data

Jul. 8, 2010 (JP) ................................ 2010-156076

(51) Int. Cl.
*H04N 5/235* (2006.01)
*H04N 3/14* (2006.01)

(52) U.S. Cl.
USPC ..... 348/229.1; 348/297; 348/308; 250/208.1; 341/155; 341/164

(58) Field of Classification Search
USPC ........... 348/229.1, 230.1, 302, 297, 303, 308, 348/310
See application file for complete search history.

(56) References Cited

U.S. PATENT DOCUMENTS

| | | | |
|---|---|---|---|
| 8,310,581 B2 * | 11/2012 | Itakura et al. ................. | 348/308 |
| 2009/0195682 A1 * | 8/2009 | Koh et al. ...................... | 348/308 |
| 2012/0038809 A1 * | 2/2012 | Lee et al. ....................... | 348/308 |
| 2013/0076948 A1 * | 3/2013 | Tanaka .......................... | 348/281 |

OTHER PUBLICATIONS

M.F. Snoeij et al., "A CMOS Image Sensor with a Column-Level Multiple-Ramp Single-Slope ADC", ISSCC 2007 'Digest of Technical Papers', Feb. 2007, 3 Pages.
Jeonghwan Lee et al., "A 10b Column-wise Two-step Single-slope ADC for High-speed CMOS Image Sensor", IEEE International Sensor Workshop, Jun. 2007, 4 Pages.

\* cited by examiner

*Primary Examiner* — Hung Lam
(74) *Attorney, Agent, or Firm* — Oblon, Spivak, McClelland, Maier & Neustadt, L.L.P.

(57) ABSTRACT

According to one embodiment, a pixel outputs a photoelectrically converted signal. A reference ramp generating circuit generates a first ramp wave and a second ramp wave having a step width smaller than that of the first ramp wave. A column ADC circuit performs switching between the first ramp wave and the second ramp wave on the basis of the signal level of the signal from the pixel, compares the ramp wave with the signal level, and detects a signal component of the pixel by CDS.

14 Claims, 20 Drawing Sheets

SOLID STATE IMAGING DEVICE

CROSS-REFERENCE TO RELATED APPLICATIONS

This application is based upon and claims the benefit of priority from the prior Japanese Patent Application No. 2010-156076, filed on Jul. 8, 2010; the entire contents of which are incorporated herein by reference.

FIELD

Embodiments described herein relate generally to a solid state imaging device.

BACKGROUND

A CMOS image sensor can use a column analog-to-digital converter (column ADC) having multiple single-slope ADCs, each being arranged in a column, as a circuit for converting an analog signal, which is output from a pixel, into a digital signal. In the column ADC circuit, not only analog Correlated Double Sampling (CDS) but also digital CDS may be performed for the purpose of noise reduction. Furthermore, in order to boost the speed of the single-slope ADC, a two-step single-slope type ADC has been being used in some cases.

In the two-step single-slope column ADC circuit, a digital CDS operation cannot be performed. This degrades the image quality. It is specifically required to suppress the random noise occurring when a signal level is small.

DETAILED DESCRIPTION

In general, according to one embodiment, a solid state imaging device includes a pixel array, a reference ramp generating circuit, and a column ADC circuit. The pixel outputs a photoelectrically converted signal. The reference ramp generating circuit generates a first ramp wave and a second ramp wave having a step width smaller than that of the first ramp wave. The column ADC circuit performs switching between the first ramp wave and the second ramp wave on the basis of the signal level of the signal output from the pixel and then compares the signal level with the selected ramp wave to detect a signal component of the pixel by correlated double sampling (CDS).

Exemplary embodiments of a solid state imaging device will be explained below in detail with reference to the accompanying drawings. The present invention is not limited to the following embodiments.

First Exemplary Embodiment

Figure 1:
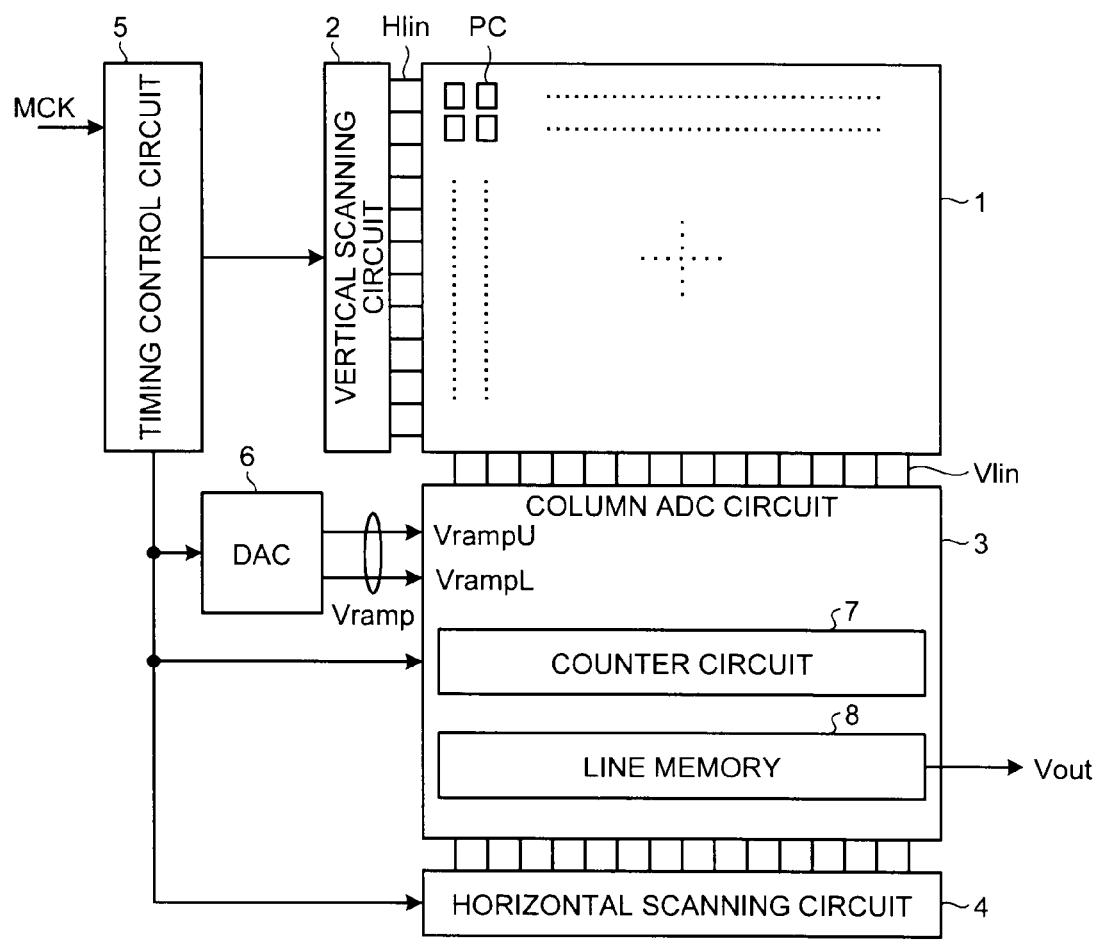
FIG. 1 is a block diagram illustrating a schematic configuration of a solid state imaging device according to a first exemplary embodiment.

FIG. 1 is a block diagram illustrating a schematic configuration of a solid state imaging device according to a first exemplary embodiment.

Referring to FIG. 1, the solid state imaging device includes: a pixel array 1 in which pixels PC storing photoelectrically converted charges are arranged in a matrix, i.e., in rows and columns; a vertical scanning circuit 2 that scans the pixels PC as read targets in a vertical direction; a column ADC circuit 3 that detects a signal component of each pixel PC by CDS; a horizontal scanning circuit 4 that scans the pixels as read targets in a horizontal direction; a timing control circuit 5 that controls the read and storage timings of each pixel; and a reference ramp generating circuit 6 that outputs a reference ramp Vramp to the column ADC circuit 3. The timing control circuit 5 is applied with a master clock MCK.

In the pixel array 1, horizontal control lines, each along with a row direction, are provided for the read control of the pixels PC, and vertical signal lines V1in, each along with a column direction, are provided for the signal transfer from the pixels PC.

The reference ramp generating circuit 6 can generate a first ramp wave VrampU and a second ramp wave VrampL, as a reference ramp Vramp. Here, the second ramp wave VrampL may have a step width smaller than that of the first ramp wave VrampU. The step width of each of the first ramp wave VrampU and the second ramp wave VrampL can be set on the basis of a digital value output from the timing control circuit 5.

The column ADC circuit 3 can perform switching between the first ramp wave VrampU and the second ramp wave VrampL on the basis of the signal level of the signal output from each pixel PC, and then compare the signal level with either of the reference ramp waves to detect a signal component of each pixel by CDS.

Here, the column ADC circuit 3 includes a counter circuit 7 and a line memory 8. The counter circuit 7 counts up or counts down on the basis of the result of the comparison between the signal read-out from the pixel PC and the reference ramp Vramp and calculates a differential between the reference level of the CDS and the signal level. The line memory 8 holds the count results for the horizontal pixels that are obtained by the counter circuit 7.

Further, since the pixels PC are vertically scanned by the vertical scanning circuit 2, the pixels PC in the row direction are selected and the signals read-out from the pixels PC are transferred to the column ADC circuits 3 via the vertical signal lines V1in. Since it is possible to obtain a differential between the reference level and the signal level of the signal read-out from the pixel PC, the signal component of each pixel PC is detected by CDS and is then output as data Vout.

In regard with the column ADC circuit 3, when the signal level of the signal output from the pixel PC exceeds a predetermined value, the signal component of each pixel PC is detected based on the two-step single-slope AD conversion by CDS. Meanwhile, when the signal level of the signal from the pixel PC is equal to or less than the predetermined value, the signal component of the pixel PC is detected based on the one-step single-slope AD conversion by CDS.

That is, in the column ADC circuit 3, in a case where the signal level of the signal output from the pixel PC exceeds a predetermined value, a first sampling of sampling the reference level of the signal is performed on the basis of the result of the comparison between the signal level and the second ramp wave VrampL, and then a second sampling of sampling the signal level of the signal is performed on the basis of the result of the comparison between the signal level and the first ramp wave VrampU. With this operation, a first phase of coarse AD conversion is performed with respect to the signal level of the signal. After that, a third sampling of sampling the signal level of the signal is performed on the basis of the result of the comparison between the signal level and the second ramp wave VrampL. With this operation, a second phase of fine AD conversion is performed with respect to the signal level of the signal.

Further, in the column ADC circuit 3, in a case where the signal level of the signal output from the pixel PC is equal to or less than a predetermined value, the first sampling of sampling the reference level of the signal is performed on the basis of the result of the comparison between the signal level and the second ramp wave VrampL, and after that a fourth sampling of sampling the signal level of the signal is performed on the basis of the result of the comparison between the signal level and the second ramp wave VrampL.

Accordingly, in a case where the signal level of the signal output from the pixel PC is large, the second phase of fine AD conversion can be performed only within a range of one step of the first ramp wave VrampU in which the second sampling is performed, so that the speed of the AD conversion process can be boosted.

On the other hand, in a case where the signal level of the signal output from the pixel PC is small, the fourth sampling can be performed without comparison between the signal level and the first ramp wave VrampU. This means there is no need for switching between the first ramp wave VrampU and the second ramp wave VrampL. For this reason, it is possible to prevent the intrusion and mixing of KTC noise occurring at the moment of switching between the first ramp wave VrampU and the second ramp wave VrampL, and thus it is possible to suppress the degradation of the image quality attributable to the small signal level.

In regard with the above-described exemplary embodiment, the description is made with the case where the signal output from the pixel PC is directly input to the column ADC circuit 3. However, a column amplifier circuit may be provided between the pixel array 1 and the column ADC circuit 3, and thus the signal output from the pixel PC may be amplified on a column basis and be then input to the column ADC circuit 3.

FIGS. 2A to 2D are circuitry diagrams illustrating configuration examples of the pixel PC of the solid state imaging device of FIG. 1.

Figure 2A:
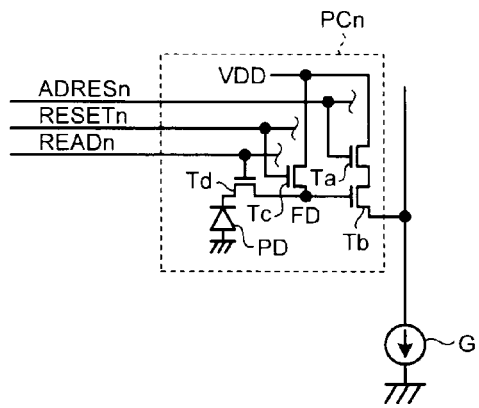
FIGS. 2A to 2D are circuitry diagrams illustrating configuration examples of a pixel PC of the solid state imaging device of FIG. 1.

Referring to FIG. 2A, each pixel PCn is provided with a photodiode PD, a row selection transistor Ta, an amplifier transistor Tb, a reset transistor Tc, and a read transistor Td. A floating diffusion FD is formed at a contact point, as a node, of the amplifier transistor Tb, the reset transistor Tc, and the read transistor Td.

In addition, a source of the read transistor Td is connected to the photodiode PD, a gate of the read transistor Td is applied with a read signal READn. A source of the reset transistor Tc is connected to a drain of the read transistor Td, a gate of the reset transistor Tc is applied with a reset signal RESETn, and a drain of the reset transistor Tc is connected to a power source potential VDD. A gate of the row selection transistor Ta is applied with a row selection signal ADRESn, a drain of the row selection transistor Ta is connected to the power source potential VDD. A source of the amplifier transistor Tb is connected to the vertical signal line V1in, a gate of the amplifier transistor Tb is connected to a drain of the read transistor Td, and a drain of the amplifier transistor Tb is connected to a source of the row selection transistor Ta. A current source G is connected to the vertical signal line V1in.

The horizontal control line H1in of FIG. 1 is used for the transfer of the read signal READn, the reset signal RESETn, and the row selection signal ADRESn to the pixels PC on a row basis.

Figure 2B:
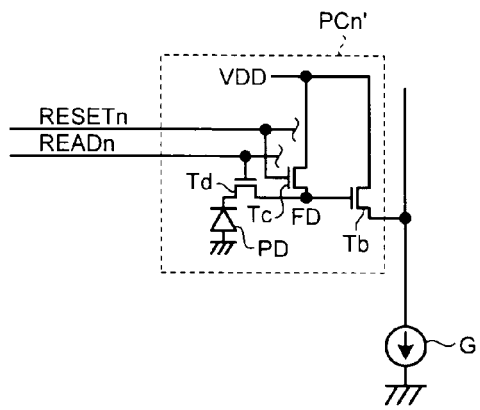

FIG. 2B illustrates a pixel PCn' which lacks a row selection transistor Ta as compared to the configuration of the pixel PC shown in FIG. 2A. The pixel PCn' is configured to be able to switch between the power source potential VDD and the ground potential.

In unselected rows, the potential of the floating diffusion FD is set to the ground potential via the reset transistor Tc and thus the amplifier transistor Tb is in OFF state. Meanwhile, in selected rows, the potential of the floating diffusion FD is set to the power source potential VDD via the reset transistor Tc, and thus the amplifier transistor Tb is in ON state.

Figure 2C:
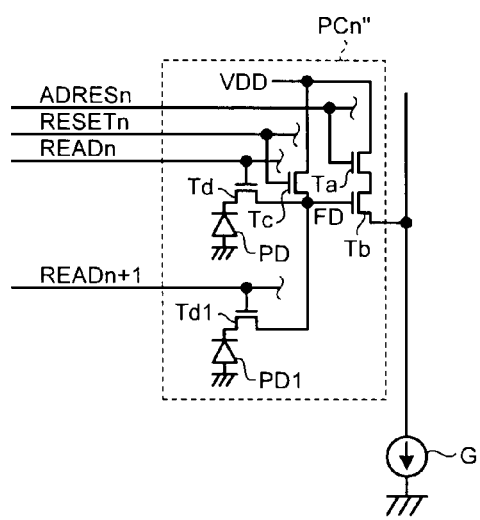

Referring to FIG. 2C, a pixel PCn" further includes a read transistor Td1 and a photodiode PD1 as compared with the configuration of the pixel PCn. One amplifier transistor Tb is shared by two pixels.

Figure 2D:
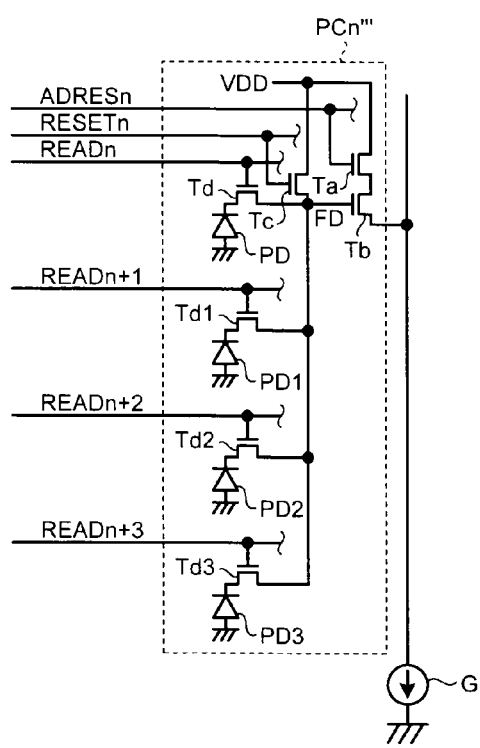

Referring to FIG. 2D, a pixel PCn'" further includes read transistors Td1 to Td3 and photodiodes PD1 to PD3 as compared with the pixel PCn, and one amplifier transistor Tb is shared by four pixels.

Second Exemplary Embodiment

Figure 3:
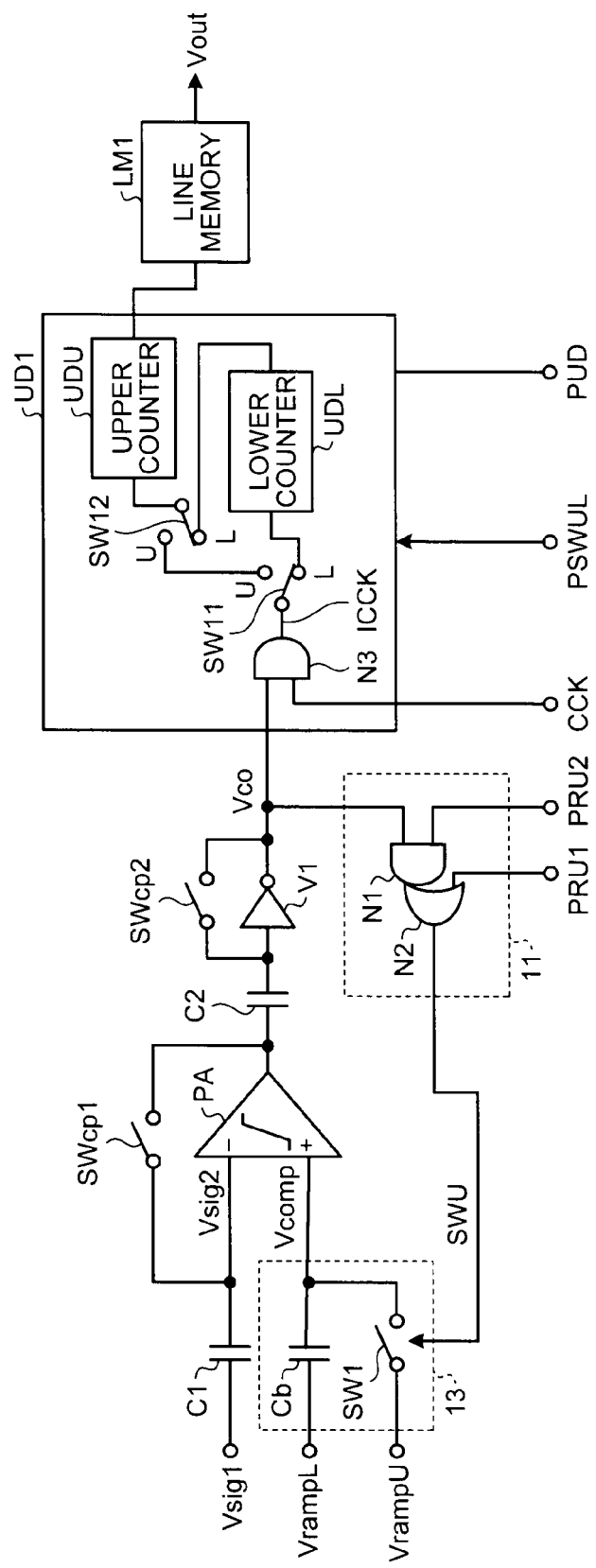
FIG. 3 is a block diagram illustrating a schematic configuration of a column ADC circuit applied to a solid state imaging device according to a second exemplary embodiment.

FIG. 3 is a block diagram illustrating a schematic configuration of a column ADC circuit applied to a solid state imaging device according to a second exemplary embodiment. Hereinbelow, the description is made with the case of using the pixel PCn of FIG. 2A, as a pixel PC.

Referring to FIG. 3, a column ADC circuit 3 includes: condensers C1, C2, and Cb; switches SW1, SWcp1, and SWcp2; a comparator PA; an inverter V1; an up-down counter UD1; a line memory LM1; and ramp wave selection control circuits 11, each corresponding to a column. A block of the condenser Cb and the switch SW1 constitutes a ramp wave selection circuit 13.

A ramp wave selection control circuit 11 can perform an ON/OFF control of the switch SW1 on the basis of the output of the comparator PA. In more detail, in a case where the output of the comparator exceeds a predetermined value, when sampling the signal level of the signal read-out from the pixel PC, the switch SW1 is turned on and thus a first phase of coarse AD conversion can be performed. After that, the switch SW1 is turned off, and then a second phase of fine AD conversion can be performed. In a case where the output of the comparator PA is equal to or less than a predetermined value, when sampling the signal level of the signal from the pixel PC, the AD conversion can be performed with the switch SW1 being in OFF state.

Here, the up-down counter UD1 includes an upper counter UDU, a lower counter UDL, a switch 11, a switch 12, and a logical AND circuit N3. The ramp wave selection control circuit 11 includes a logical AND circuit N1 and a logical OR circuit N2.

The inverted input terminal of the comparator PA is applied with a signal Vsig1 read-out from the pixel PC via the condenser C1. The non-inverted input terminal of the comparator PA is applied not only with the second ramp wave VrampL via the condenser Cb but also with the first ramp wave VrampU via the switch SW1. A switch SWcp1 is connected between the inverted input terminal and the output terminal of the comparator PA.

The output terminal of the comparator PA is connected to an input terminal of the inverter V1 via the condenser C2. A switch SWcp2 is connected between the input terminal and the output terminal of the inverter V1.

An input terminal of the logical AND circuit N3 is connected to the output terminal of the inverter V1 and the other input terminal of the logical AND circuit N3 is applied with a reference clock CCK. The switches SW11 and SW12 can perform switching between a state in which the upper counter UDU is connected between the output terminal of the AND circuit N3 and the input terminal of the line memory LM1, and a state in which the lower counter UDL is coupled to a preceding stage of the upper counter UDU and the upper counter UDU is connected between the output terminal of the logical AND circuit N3 and the line memory LM1.

An input terminal of the logical AND circuit N1 is connected to the output terminal of the inverter V1, and the other input terminal of the logical AND circuit N1 is applied with a pulse signal PRU2. An input terminal of the logical OR circuit N2 is connected to the output terminal of the logical AND circuit N1, and the other input terminal of the logical OR circuit N2 is applied with a pulse signal PRU1. The output terminal of the logical OR circuit N2 is connected to a control terminal which performs an ON/OFF control of the switch SW1.

Figure 4:
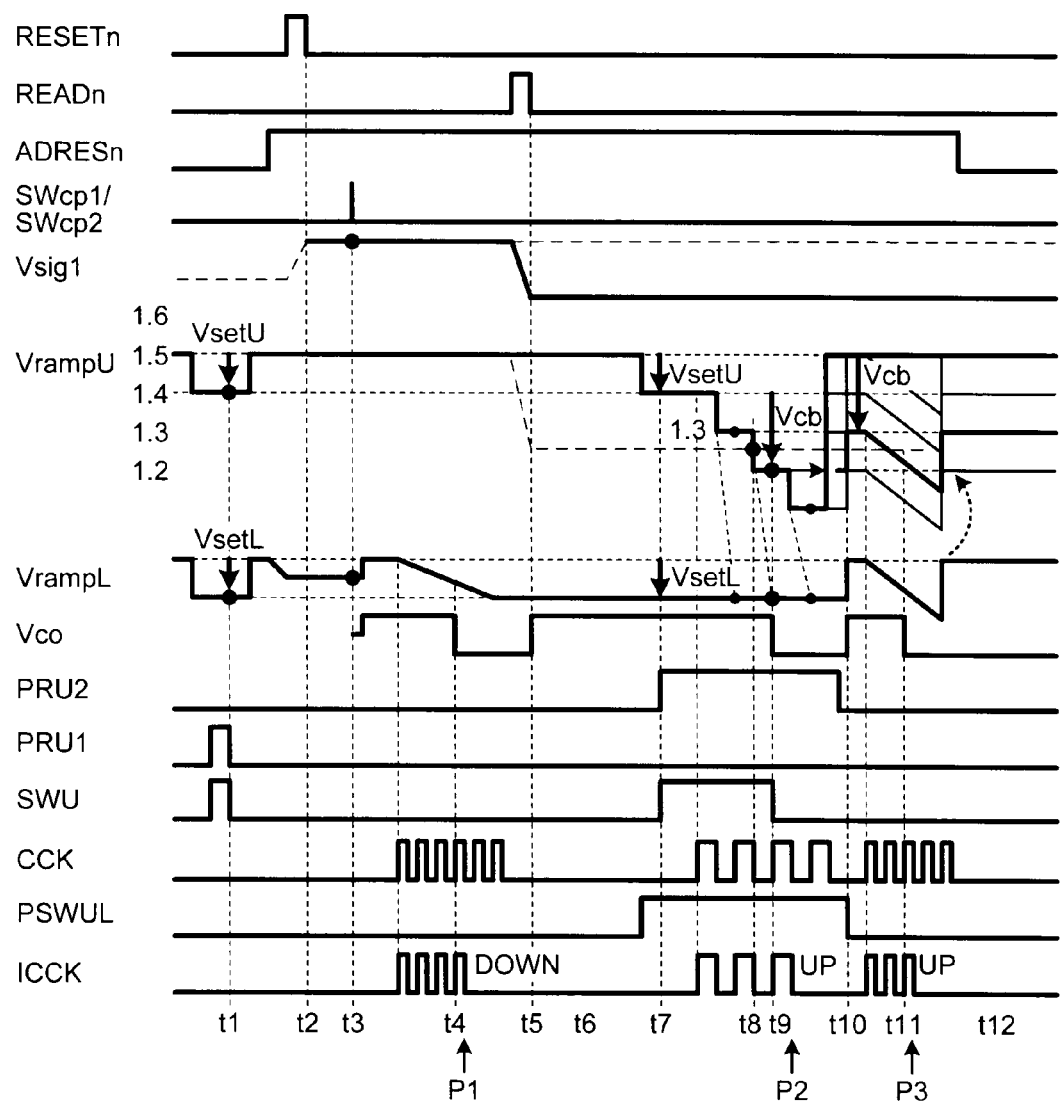
FIG. 4 is a timing chart illustrating waveforms of respective units of the solid state imaging device of FIG. 3 when a signal level is large.

FIG. 4 is a timing chart illustrating waveforms of respective units of the solid state imaging device of FIG. 3 when the signal level is large.

Referring to FIG. 4, in a case where a row selection signal ADRESn is at a low level, the row selection transistor Ta is in OFF state and thus it does not perform a source follower operation. Accordingly, a signal is not output to the vertical signal line V1in. At this moment, if the read signal READn and the reset signal RESETn become a high level, the read transistor Td is turned on and the charge accumulated in the photodiode PD is discharged to the floating diffusion FD. The charge is then discharged to the power source VDD via the reset transistor Tc.

If the read signal READn becomes a low level after the discharge of the charge in the photodiode PD to the power source VDD, an effective signal charge start to accumulate in the photodiode PD. At this time, the first ramp wave VrampU and the second ramp wave VrampL sustain the initial values.

After that, the first ramp wave VrampU falls from the initial value by a voltage VsetU, and the second ramp wave VrampL falls from the initial value by a voltage VsetL. The voltages VsetU and VsetL may correspond to the amplitude of one step of the first ramp wave VrampU.

If the pulse signal PRU1 rises from this state, the selection signal SWU rises via the logical OR circuit N2 and thus the switch SW1 is turned on, so that a differential between the reference voltage of the first ramp wave VrampU and the reference voltage of the second ramp wave VrampL is held in the condenser Cb (time point t1). The reference voltage of the first ramp wave VrampU and the reference voltage of the second ramp wave VrampL may differ from each other.

Next, after the falling of the pulse signal PRU1, the first ramp wave VrampU and the second ramp wave VrampL are recovered to the respective initial values. Then, if the row selection signal ADRESn becomes a high level, the row selection transistor Ta of the pixel PC is turned on and the power source potential VDD is applied to the drain of the amplifier transistor Tb. As a result, a source follower circuit is formed by the amplifier transistor Tb and a constant current circuit G.

Next, if the reset signal RESETn becomes a high level while the row selection transistor Ta is in ON state, the reset transistor Tc is turned on, and thus the unnecessary charge is reset which is generated in the floating diffusion FD due to current leakage or the like. Next, the gate of the amplifier transistor Tb is applied with a voltage corresponding to the reference level of the floating diffusion FD. At this moment, the amplifier transistor Tb and the constant current circuit G form a source follower circuit, so that the voltage of the vertical signal line V1in follows the voltage applied to the gate of the amplifier transistor Tb and the resultant voltage is output to the vertical signal line V1in as an output voltage Vsig1 of the reference level (time point t2).

At the time when the output voltage Vsig1 of the reference level is output to the vertical signal line V1in, if the switch SWcp1 is turned on, the input voltage of the inverted input terminal of the comparator PA is clamped at the output voltage, and an operating point is settled (time point t3). In this case, the differential between the output voltage Vsig1 read-out from the pixel PCn and the output voltage of the comparator PA is held in the condenser C1, and the input voltage of the comparator PA is set to zero.

Further, at the time when the output voltage Vsig1 of the reference level is output to the vertical signal line V1in, if the switch SWcp2 is turned on, the input voltage of the inverter V1 is clamped at the output voltage Vco, and an operating point is settled. In this case, the differential between the output voltage of the comparator PA and the output voltage Vco of the inverter V1 is held in the condenser C2, and the input voltage of the inverter V1 is set to zero.

Next, after the switch SWcp1 is turned off and the operating point of the comparator PA is settled, then, after a lapse of a predetermined time, the switch SWcp2 is turned off and the operating point of the inverter V1 is settled. At this time, the second ramp wave VrampL is integrated to the negative side with respect to the zero level. For example, in the case of an AD operation for 10 bits (0 to 1023 counts), the second ramp can be set to have the value of 32 counts. With this operation, it is possible to set the black level of the signal (the reference level of the signal read-out from the pixel PCn) to the value of 32 counts. In addition, since the reference level of the signal read-out from the pixel PCn is put in the condenser C1, it is possible to realize the analog CDS operation from which the reference level is removed.

Here, the inverted input terminal of the comparator PA is applied with the output voltage Vsig1 of the reference level via the condenser C1 and the non-inverted input terminal of the comparator PA is applied with the second ramp wave VrampL via the condenser Cb as the reference voltage Vcomp.

Next, in the comparator PA, the output voltage Vsig2 of the reference level is compared with the reference voltage Vcomp. The output voltage of the comparator PA is inverted by the inverter V1, and is then input, as the output voltage Vco, to one of input terminals of the logical AND circuit N3.

Next, in the second ramp wave VrampL, the downward-slope starts from the initial value until the value of the second ramp wave decreases from the initial value by the voltage VsetL. The other input terminal of the logical AND circuit N3 is applied with the reference clock CCK at the start of the downward-slope of the second ramp wave VrampL. In this case, the cycle of the reference clock CCK can be adjusted to match the time that it takes for the level of the second ramp wave VrampL to change by one step. At this moment, since the pulse signal PRU2 is set to a low level and the selection signal SWU is at a low level, the switch SW1 is in OFF state.

Since the selection signal PSWUL is set to a low level, and the switches SW11 and SW12 are switched to an L side, the output terminal of the logical AND circuit N3 is connected to the input terminal of a lower counter UDL. Furthermore, the up-down counter UD1 is set by the selection signal PUD so as to count down.

Next, in a case where the output voltage Vsig2 of the reference level is smaller than the reference voltage Vcomp, the output voltage Vco becomes a high level. Accordingly, the reference clock CCK passes through the logical AND circuit N3, and the reference clock ICCK that passed through is counted down by the lower counter UDL.

Next, if the output voltage Visg2 of the reference level matches the reference voltage Vcomp, the output voltage of the comparator PA rises and thus the output voltage Vco becomes a low level. Accordingly, the reference clock CCK is intercepted by the logical AND circuit N3, and the down count operation of the lower counter UDL is stopped. As a result, the output voltage Vsig2 of the reference level is converted into a digital value D through the first sampling P1, and it is held in the lower counter UDL as the reference level of the signal read-out from the pixel PCn (time point t4).

Next, if the read signal READn becomes a high level when the row selection transistor Ta of the pixel PCn is ON state, the read transistor Td is turned on and the charge stored in the photodiode PD is transferred to the floating diffusion FD, so that the voltage corresponding to the signal level of the floating diffusion FD is applied to the gate of the amplifier transistor Tb. Here, since the amplifier transistor Tb and the constant current circuit G form a source follower circuit, the voltage of the vertical signal line V1in follows the voltage applied to the gate of the amplifier transistor Tb, and is output to the vertical signal line V1in as the output voltage of the signal level (time point t5).

The selection signal PSWUL rises after the outputting of the voltage to the vertical signal line V1in as the output voltage Vsig1 of the signal level, the switches SW11 and SW12 are switched to a U side, the output terminal of the logical AND circuit N3 is connected to the input terminal of the upper counter UDU. The up-down counter UD1 is set by the selection signal PUD so as to count up. The first ramp wave VrampU falls from the initial value by the voltage VsetU in a step shape.

Here, the inverted input terminal of the comparator PA is applied with the output voltage Vsig1 of the signal level via the condenser C1, and the non-inverted input terminal of the comparator PA is applied with the second ramp wave VrampL as the reference voltage Vcomp via the condenser Cb.

Next, the output voltage Vsig2 of the signal level is compared with the reference voltage Vcomp in the comparator PA. The output voltage of the comparator PA is inverted by the inverter V1, and is then input to one of the input terminals of the logical AND circuit N3 as the output voltage Vco.

Here, in a case where the output voltage Vsig2 of the signal level exceeds the reference voltage Vcomp, the output voltage Vco becomes a high level. If the pulse signal PRU2 rises in this state, the output of the logical AND circuit N1 becomes a high level. As a result, the selection signal SWU rises and the switch SW1 is turned on (time point t7). The non-inverted input terminal of the comparator PA is applied with the first ramp wave VrampU via the switch SW1 as the reference voltage Vcomp.

Next, in the first ramp wave VrampU, the downward-slope is started from the position (as the start point) which is stepped down from the initial value by the voltage VsetU. The other input terminal of the logical AND circuit N3 is applied with the reference clock CCK at the start of the downward-slope of the first ramp wave VrampU. In this case, the cycle of the reference clock CCK can be adjusted to match the time that it takes for the level of the first ramp wave VrampU to change by one step.

Next, in a case where the output voltage Vsig2 of the signal level is smaller than the reference voltage Vcomp, the output voltage Vco becomes a high level. Accordingly, the reference clock CCK passes through the logical AND circuit N3, and the reference clock ICCK that passed through the logical AND circuit is counted up by the upper counter UDU.

Next, if the output voltage Vsig2 of the signal level matches the reference voltage Vcomp, the output voltage of the comparator PA rises and the output voltage Vco becomes a low level. For this reason, the reference clock CCK is intercepted by the logical AND circuit N3 and thus the up-count of the upper counter UDU stops. Accordingly, the output voltage Vsig2 of the signal level is converted into a digital value D through the second sampling P2, and is then held in the upper counter UDU as the first step signal level of the signal read-out from the pixel PCn (time point t9).

In this case, when the output voltage Vco becomes a low level, the selection signal SWU falls and thus the switch SW1 is turned off. When the switch SW1 is turned off, the voltages Vcb corresponding to the number of down-steps are held in the condenser Cb, which occurred during the period from the start point of the downward-slope of the first ramp wave VrampU (i.e., the position stepped down from the initial value of the first ramp wave VrampU by the voltage VsetU), to the inversion of the output voltage of the comparator PA1. For example, in a case where the voltage corresponding to one step of the first ramp wave VrampU is 0.1 V, the initial value of the first ramp wave VrampU is 1.5 V, and the output voltage of the comparator PA1 is inverted when the first ramp wave VrampU is at 1.2 V; the voltage Vcb of 0.2V is held in the condenser Cb.

Next, when the selection signal PSWUL falls after the falling of the pulse signal PRU2, the switches SW11 and SW12 are switched to the L side, and the output terminal of the logical AND circuit N3 is connected to the lower counter UDL (time point t10).

Here, the inverted input terminal of the comparator PA is applied with the output voltage Vsig1 of the signal level via the condenser C1, and the non-inverted input terminal of the comparator PA is applied with the second ramp wave VrampL via the condenser Cb as the reference voltage Vcomp.

Next, in the comparator PA, the output voltage Vsig2 of the signal level is compared with the reference voltage Vcomp. The output voltage of the comparator PA is inverted by the inverter V1 and is then input to one of the input terminals of the logical AND circuit N3 as the output voltage Vco.

Next, in the second ramp wave VramL, the downward-slope is started. At this time, the voltage Vcb is held in the condenser Cb. Accordingly, the downward-slope of the reference voltage Vcomp is started from the position (as starting position), which is stepped down by the voltage Vcb from the initial value of the second ramp wave VrampL. The other input terminal of the logical AND circuit N3 is applied with the reference clock CCK at the start of the downward-slope of the second ramp wave VrampL. Furthermore, the cycle of the reference clock CCK can be adjusted to match the time that it takes for level of the second ramp wave VrampL to change by one step.

Next, in a case where the output voltage Vsig2 of the signal level is smaller than the reference voltage Vcomp, the output voltage Vco becomes a high level. Accordingly, the reference clock CCK passes through the logical AND circuit N3 and the passed reference clock ICCK is counted up by the lower counter UDL.

Next, if the output voltage Vsig2 of the signal level matches the reference voltage Vcomp, the output voltage of the comparator PA rises and the output voltage Vco becomes a low level. In this case, the reference clock CCK is intercepted by the logical AND circuit N3 and the up-count of the lower counter UDL stops. Accordingly, a differential between the output voltage Vsig2 of the signal level and the output voltage Vsig2 of the reference level is converted into a digital value D through the third sampling, and is held in the lower counter UDL as the second step signal level of the signal read-out from the pixel PCn (time point t11).

Next, the digital values D held in the upper counter UDU and the lower counter UDL are sent to the line memory LM1, and are stored in the line memory LM1 as the signal component detected by the digital CDS.

In the digital CDS, it is possible to cancel the variations in the operating point attributable to the variations in the threshold values of the transistors in the comparator PA and the inverter V1, and the fixed noise such as the coupling variation generated when the switches SWcp1 and SWcp2 are turned off. At this time, KTC noise occurs in the condenser Cb for an ON/OFF control of the switch SW1. However, in a case where the amount of signal is large, since the shot noise attributable to an optical signal is dominant, the S/N ratio is not nearly influenced.

Accordingly, in a case where the signal level of the signal output from the pixel PC is large, the second phase of fine AD conversion can be performed within a range of one step of the first ramp wave VrampU in which the second sampling is performed. Accordingly, it is possible to speed up the AD conversion processing.

It is preferable that a level change of the second ramp wave VrampL in the second phase of AD conversion is larger than the level change of the first ramp wave VrampU in the first phase of AD conversion. For example, if the level change of one step of the first ramp wave VrampU in the first phase of AD conversion is 4 bits, and the level change of one step of the second ramp wave VrampL in the second phase of AD conversion is 6.5 bits; the level change is 10.5 bits in total, and is then adjusted to 10 bits for the outputting. Accordingly, 0.5 bits are used in an overlapping operation and thus the continuity of the AD conversion is improved. As a result, it is possible to implement the 10-bit AD conversion with 112 counts (16+96=112) as the value of counts, which results in 9 times faster operation (1024/112=9). Even if the frequency of the count operation is reduced by half in order to stabilize the first phase of AD conversion operation, the value of counts becomes 128 (16*2+96=128), and this results in 8 times faster operation (1024/128=8).

Figure 5:
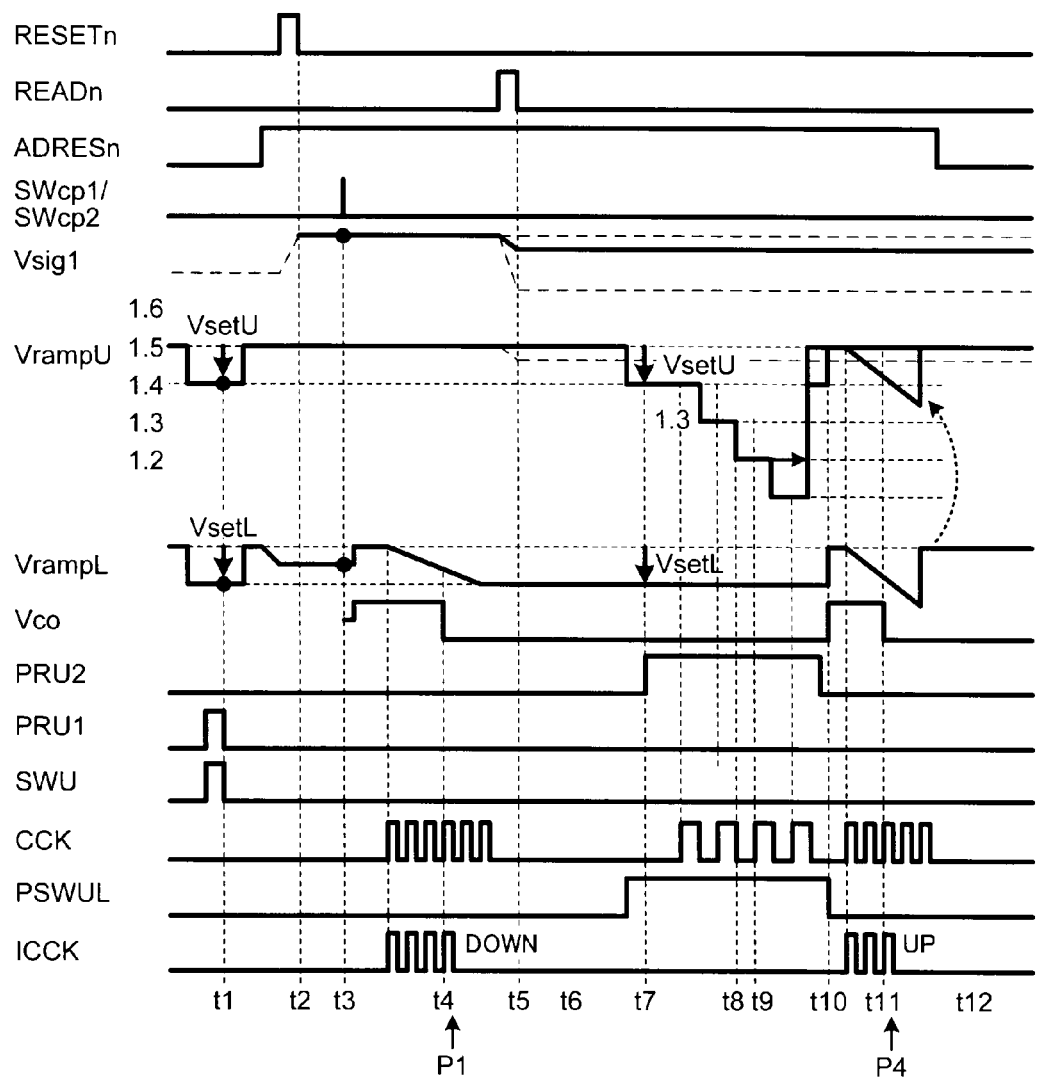
FIG. 5 is a timing chart illustrating waveforms of respective units of the solid state imaging device of FIG. 3 when a signal level is small.

FIG. 5 is a timing chart illustrating waveforms for respective units of the solid state imaging device of FIG. 3 when the signal level is small.

Referring to FIG. 5, the operation similar to that of FIG. 4 is performed within a period from time point t1 to time point t4, and thus the output voltage Vsig2 of the reference level is converted into a digital value D through the first sampling, and is then held in the lower counter UDL as the reference level of the signal read-out from the pixel PCn (time point t4). When the reference level is large, the upper counter UDU operates.

Next, when the read signal READn becomes a high level, in a case where the output voltage Vsig2 of the signal level is equal to or less than the reference voltage Vcomp, the output voltage Vco is maintained at a low level (time point t5). In this state, even if the pulse signal PRU2 rises, since the output of the logical AND circuit N1 is maintained at a low level, the switch SW1 maintains its OFF state and thus the selection signal SWU does not rise (time point t7). For this reason, the non-inverted input terminal of the comparator PA is applied with the second ramp wave VrampL via the condenser Cb as the reference voltage Vcomp.

In this case, the condenser Cb holds still the voltage that is previously stored, regardless of the voltage of the first ramp wave VrampU. In addition, even if the downward-slope of the first ramp wave VrampU is started, the output voltage Vco of the inverter V1 remains unchanged at a low level, and thus the operation of the upper counter UDU is not likely to be performed.

Next, since the selection signal PSWLU falls after the falling of the pulse signal PRU2, the switches SW11 and SW12 are switched to the L side, and the output terminal of the logical AND circuit N3 is connected to the input terminal of the lower counter UDL (time point t10).

Here, the inverted input terminal of the comparator PA is applied with the output voltage Vsig1 of the signal level via the condenser C1, and the non-inverted input terminal of the comparator PA is applied with the second ramp wave VrampL via the condenser Cb as the reference voltage Vcom.

Next, in the comparator PA, the output voltage Vsig2 of the signal level is compared with the reference voltage Vcomp. The output voltage of the comparator PA is inverted by the inverter V1, and is then input to the logical AND circuit N3 as the output voltage Vco.

Next, in the second ramp wave VrampL, the downward-slope falling from the initial value is started. The other input terminal of the logical AND circuit N3 is applied with the reference clock CCK at the start of the downward-slope of the second ramp wave VrampL. Furthermore, in this case, the cycle of the reference clock CCK can be adjusted to match the time it takes for the level of the second ramp wave VrampL to change by one step.

Next, in a case where the output voltage Vsig2 of the signal level is smaller than the reference voltage Vcomp, the output voltage Vco becomes a high level. Accordingly, the reference clock CCK passes through the logical AND circuit N3 and the passed reference clock ICCK is counted up by the upper counter UDU and the lower counter UDL. In a case where the signal level is small, the upper counter UDD may not operate.

Next, if the output voltage Vsig2 of the signal level matches the reference voltage Vcomp, the output voltage of the comparator PA rises and thus the output voltage Vco becomes a low level. For this reason, the reference clock CCK is intercepted by the logical AND circuit N3 and thus the up-count of the lower counter UDL is stopped. As a result, a differential between the output voltage Vsig2 of the signal level and the output voltage Vsig2 of the reference level is converted into a digital value D through the fourth sampling, and is then held in the upper counter UDU and the lower counter UDL (time point t11).

Next, the digital value D held in the upper counter UDU and the lower counter UDL is sent to the line memory LM1, and is then stored in the line memory LM1 as the signal component detected by the digital CDS.

Due to this, in a case where the signal level of the signal output from the pixel PCn is small, the fourth sampling can be performed without comparison with the first ramp wave VrampU. Accordingly, it is possible to prevent the first ramp wave VrampU and the second ramp wave VrampL from being switched to each other by the switch SW1. Accordingly, it is possible to prevent the KTC noise from intruding into the condenser Cb when the first ramp wave VrampU and the second ramp wave VrampL are switched to each other. This contributes to the suppression of the degradation in image quality when the signal level is small.

Furthermore, within a period for other than the AD conversion, it is possible to reduce the power consumption by the source follower circuit of the pixel PC by maintaining the row selection signal ADRESn at a low level. In this case, it is possible to further reduce the power consumption by turning off the comparator PA and the inverter V1.

Third Exemplary Embodiment

Figure 6:
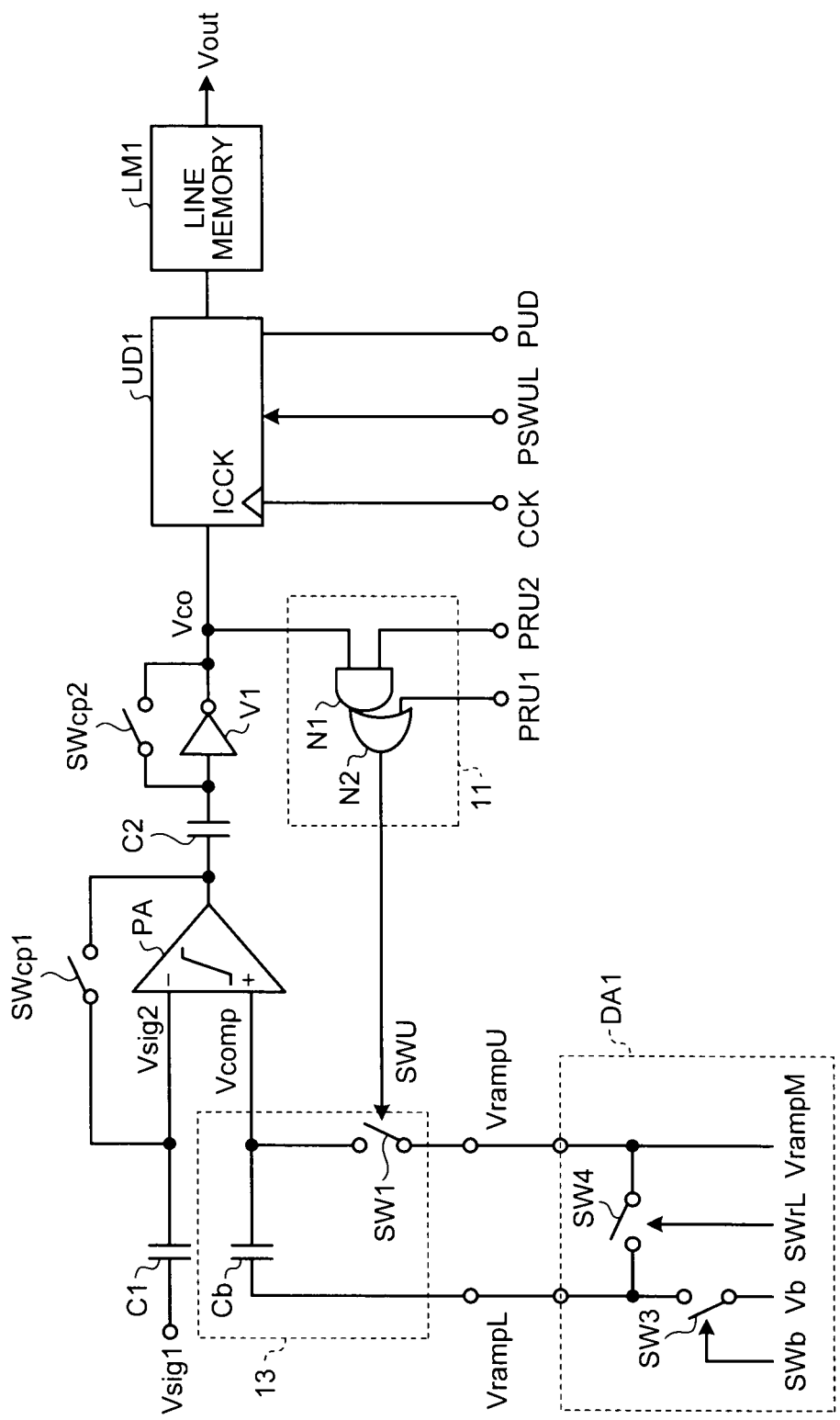
FIG. 6 is a block diagram illustrating a schematic configuration of a column ADC circuit applied to a solid state imaging device according to a third exemplary embodiment.

FIG. 6 is a block diagram illustrating a schematic configuration of a column ADC circuit applied to a solid state imaging device according to a third exemplary embodiment.

Referring to FIG. 6, the solid state imaging device further includes a reference ramp generating circuit DA1 as compared with the configuration of FIG. 3. The reference ramp generating circuit DA1 can generate a ramp wave VrampM and a direct current voltage Vb. The reference ramp generating circuit DA1 includes a switch SW4 for switching on and off the ramp wave VrampM and a switch SW3 for switching on and off the direct current voltage Vb. The ramp wave VrampM is the combination of the first ramp wave VrampU and the second ramp wave VrampL.

Figure 7:
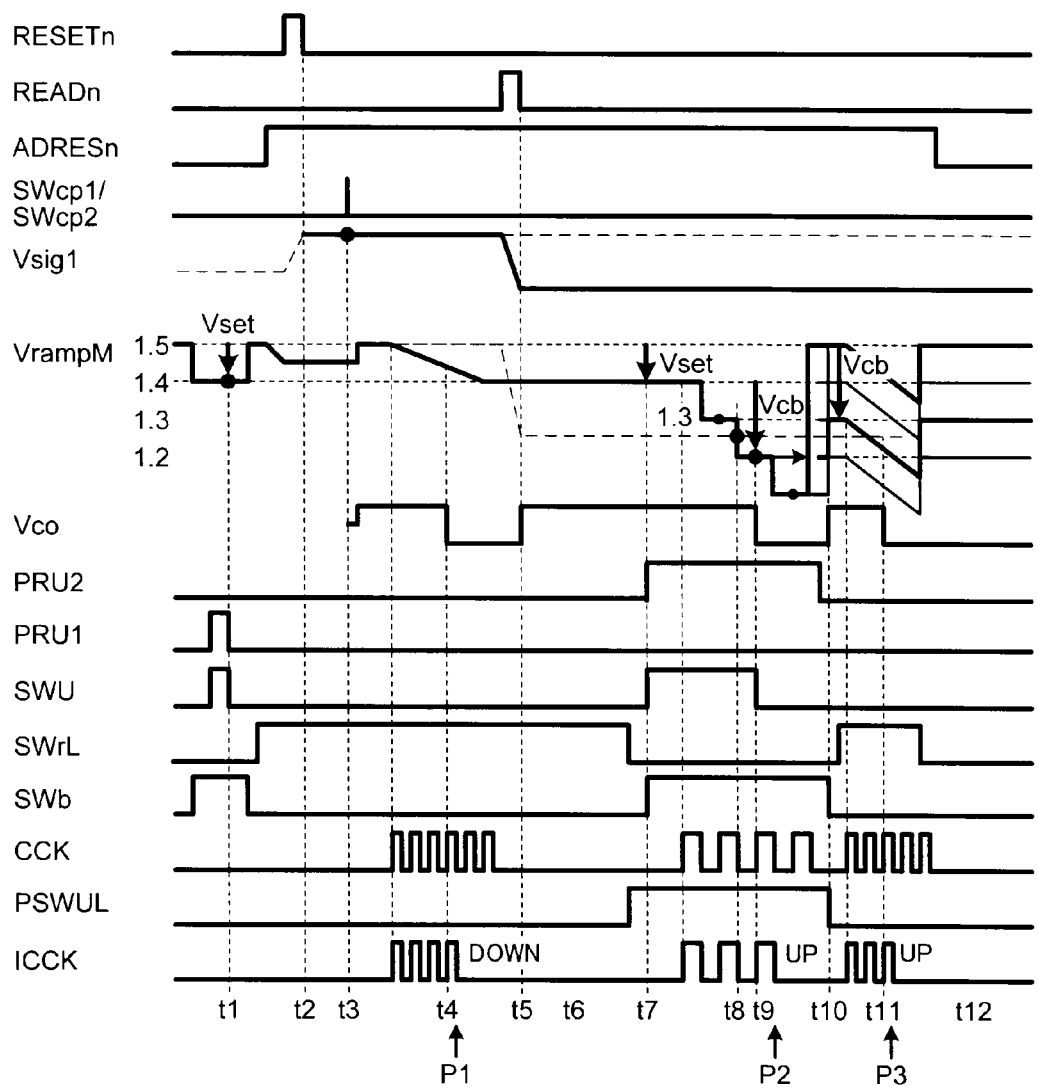
FIG. 7 is a timing chart illustrating waveforms of respective units of the solid state imaging device of FIG. 6 when a signal level is large.
Figure 8:
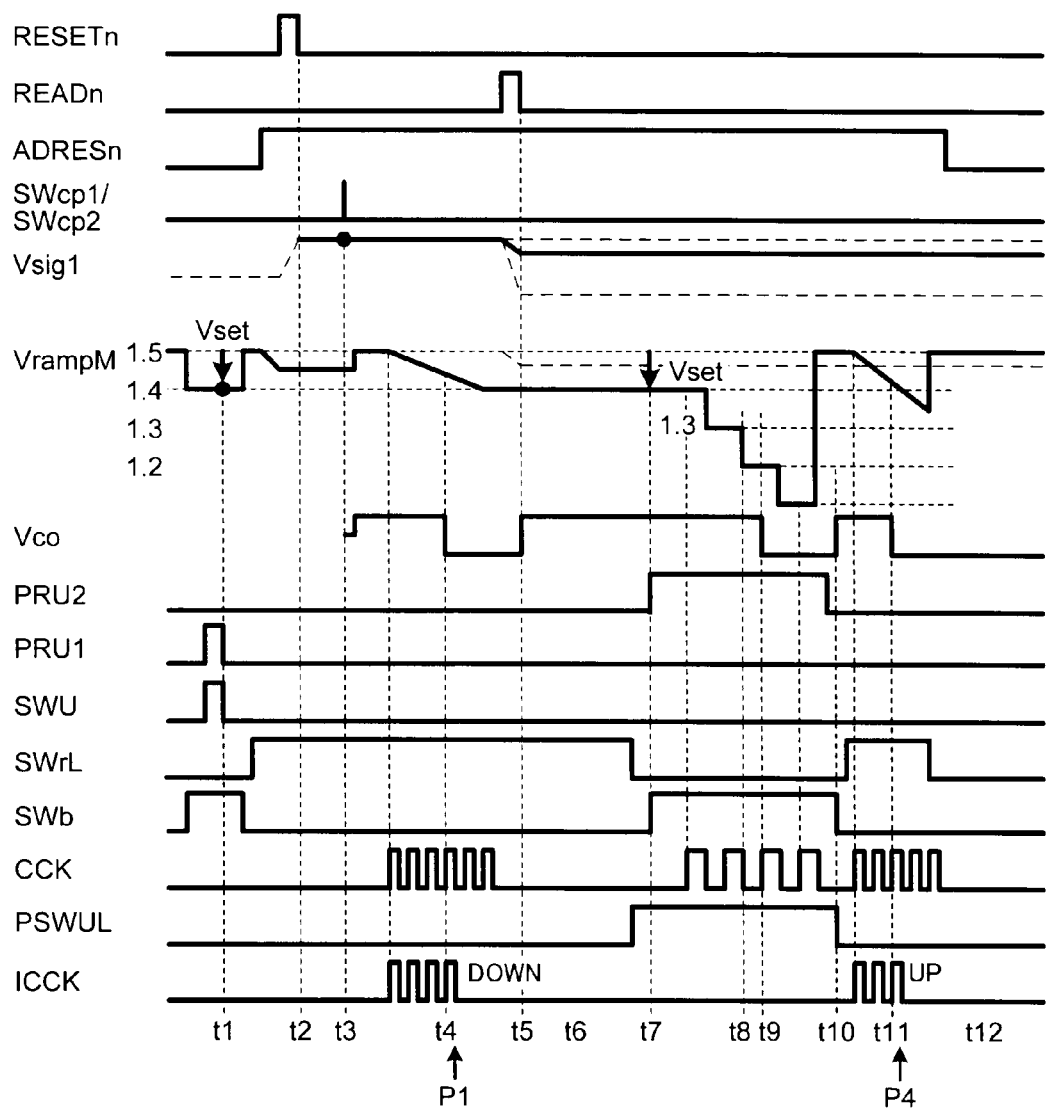
FIG. 8 is a timing chart illustrating waveforms of respective units of the solid state imaging device of FIG. 6 when a signal level is small.

FIG. 7 is a timing chart illustrating waveforms of respective units of the solid state imaging device when the signal level is large. FIG. 8 is a timing chart illustrating waveforms of the respective units of the solid state imaging device when the signal level is small.

Referring to FIG. 7 and FIG. 8, the third exemplary embodiment is different from the second exemplary embodiment in that in the second exemplary embodiment, the first ramp wave VrampU and the second ramp wave VrampL are separately applied but in the third exemplary embodiment, the first ramp wave VrampU and the second ramp wave VrampL are produced from the ramp wave VrampM.

If the selection signal SWb rises in a state in which the selection signal SWrL is at a low level, the switch SW4 is turned off and the switch SW3 is turned on. Accordingly, the ramp wave VrampM is input to the non-inverted input terminal of the comparator PA and the opposite side of the condenser Cb is applied with the direct current voltage Vb.

Next, the level of the ramp wave VrampM falls from the initial value by the voltage Vset. The voltage Vset can be adjusted so as to correspond to the amplitude of one step of the first ramp wave VrampU.

If the pulse signal PRU1 rises from this state, the selection signal SWU also rises via the logical OR circuit N2 and the switch SW1 is turned on. Accordingly, a differential between the reference voltage of the ramp wave VrampM and the direct current voltage Vb is held in the condenser (time point t1).

Next, if the selection signal SwrL rises after the falling of the selection signal SWb, the switch SW4 is turned ON and the switch SW4 is turned off. Accordingly, the ramp wave VrampM is input to the non-inverted input terminal of the comparator PA via the condenser Cb as the second ramp wave VrampL. Next, in a case where the signal level is large, the first sampling P1 of sampling the reference level of FIG. 7 is performed. Meanwhile, in a case where the signal level is small, the first sampling P1 of sampling the reference level of FIG. 8 is performed (time point t2 to time point t4)

Next, when the read signal READn is applied, the output voltage Vsig1 of the signal level is output to the vertical signal line V1in (time point t5), and then the selection signal SWrL falls. After that, if the selection signal SWb rises, the switch SW4 is turned off and the switch SW3 is turned on (time point t6).

Next, in the case where the signal level is large, since the selection signal SWU rises, the switch SW1 is turned on. Meanwhile, in the case where the signal level is small, since the selection signal SWU remains unchanged at a low level, the switch SW1 remains in OFF state. Accordingly, in the case where the signal level is large, the ramp wave VrampM is input to the non-inverted input terminal of the comparator PA via the switch SW1 as the first ramp wave VrampU; but in the case where the signal level is small, the ramp wave VrampM is not allowed to be input to the non-inverted input terminal of the comparator PA via the switch SW1 as the first ramp wave VrampU. As a result, in the case where the signal level is large, the second sampling P2 of sampling the signal level of FIG. 2 is performed (time point t9); but in the case where the signal level is small, the up counter UD1 does not operate and thus the sampling is not performed.

Here, in a case where the ramp wave VrampM is output as the first ramp wave VrampU, the start point of the downward-slope of the ramp wave VrampM can be set to the position that is stepped down, by the voltage Vset, from the initial value.

Next, if the selection signal SWr rises after the falling of the selection signal SWb, the switch SW4 is turned on and the switch SW3 is turned off. Accordingly, the ramp wave VrampM is input to the non-inverted input terminal via the condenser Cb as the second ramp wave VrampL. Furthermore, in a case where the signal level is large, the third sampling P3 of sampling the signal level of FIG. 7 is performed but in a case where the signal level is small, the fourth sampling P4 of sampling the signal level of FIG. 8 is performed (time point t11).

With this operation, the first ramp wave VrampU and the second ramp wave VrampL do not need to be separately generated. That is, since there is no need for use of two DA converters to generate the first ramp wave VrampU and the second ramp wave VrampL, the number of DA converters can be reduced.

Fourth Exemplary Embodiment

Figure 9:
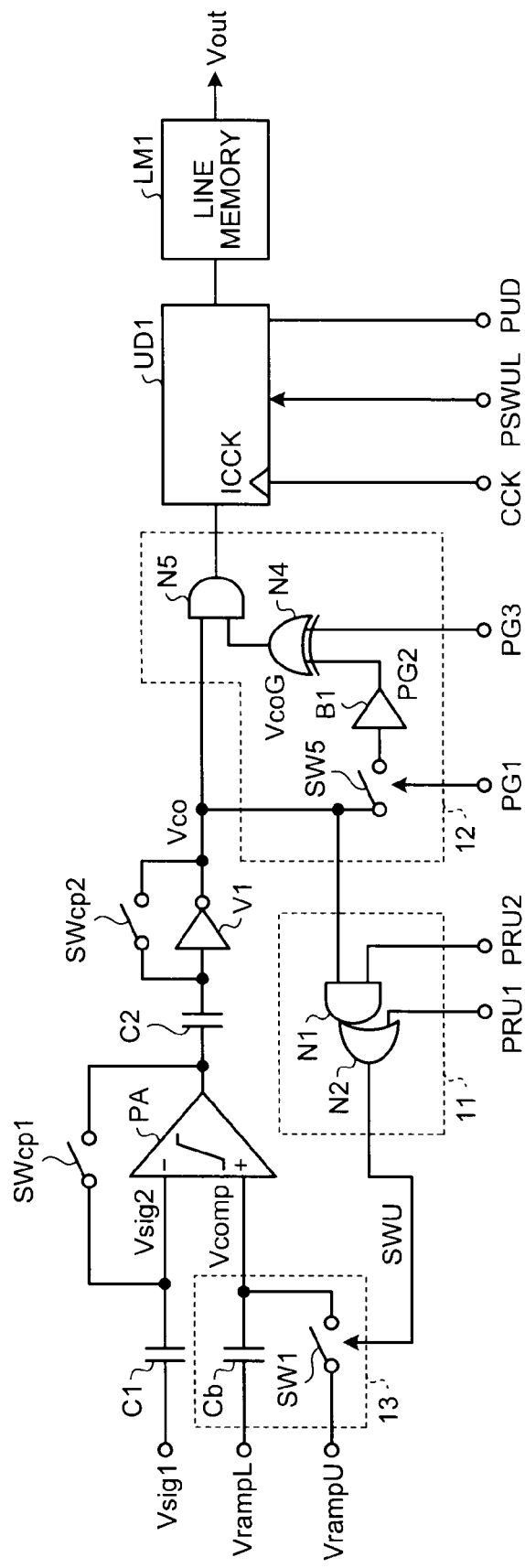
FIG. 9 is a block diagram illustrating a schematic configuration of a column ADC circuit applied to a solid state imaging device according to a fourth exemplary embodiment.

FIG. 9 is a block diagram illustrating a schematic configuration of a column ADC circuit applied to a solid state imaging device according to a fourth exemplary embodiment.

Referring to FIG. 9, the solid state imaging device further includes a counter intervention control circuit 12 as compared to the configuration of FIG. 3. The counter intervention control circuit 12 can set a timing for a fourth sampling P4 between the timing of the first sampling P1 and the timing of the second sampling P2.

The counter intervention control circuit 12 includes a switch SW5, a latch circuit B1, an exclusive OR circuit N4, and a logical AND circuit N5. The switch SW5 is connected between the output terminal of the inverter V1 and the input terminal of the latch circuit B1. One of the input terminals of the exclusive OR circuit N4 is connected to the output terminal of the latch circuit B1, and the other input terminal of the exclusive OR circuit N4 is applied with an intervention control pulse signal PG3. One of the input terminals of the logical AND circuit N5 is connected to the output terminal of the inverter V1, and the other input terminal of the logical and circuit N5 is connected to the output terminal of the exclusive OR circuit N4.

Figure 10:
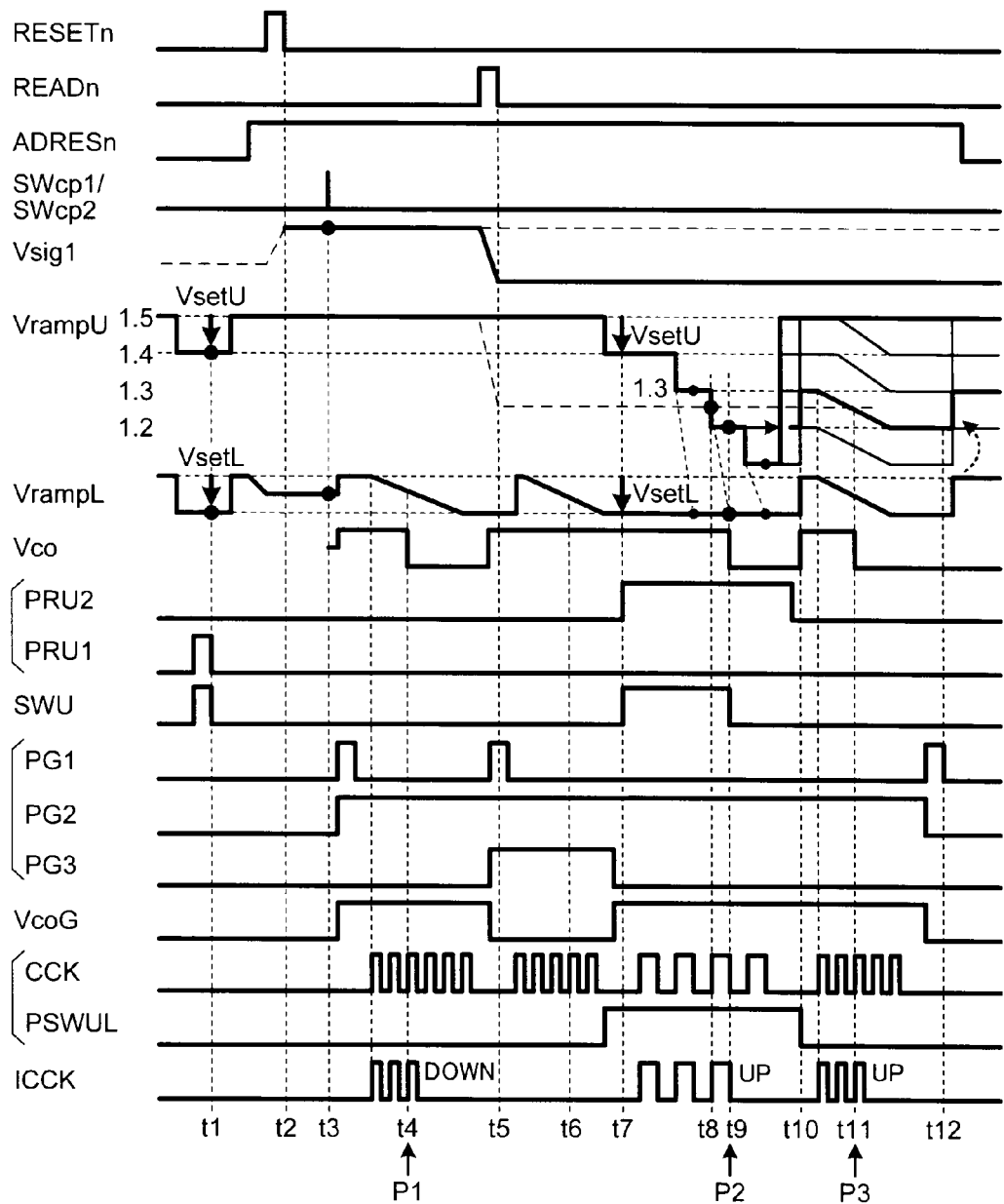
FIG. 10 is a timing chart illustrating waveforms of respective units of the solid state imaging device of FIG. 9 when a signal level is large.

FIG. 10 is a timing chart illustrating wave forms of respective units of the solid state imaging device of FIG. 9 when a signal level is large.

Referring to FIG. 10, since an intervention signal PG1 rises after the setting (time point t13) of the operating points of the comparator PA and the inverter V1, the switch SW5 is turned on. At this moment, since the output voltage Vco of the inverter V1 is a high level, the output voltage of the latch circuit B1 becomes a high level.

Next, in a case where the intervention control signal PG3 remains unchanged at a low level, the output voltage VcoG of the exclusive OR circuit N4 becomes a high level, and the output voltage Vco is input to the up-down counter UD1 via the logical AND circuit N5. In this state, the downward-slope of the second ramp wave VrampL is started and the reference clock CCK is input to the up-down counter UD1. Then, the up-down counter UD1 counts down, and a first sampling P1 of sampling a reference level of a signal output from a pixel PC is performed (time point t4).

Next, the intervention signal PG1 rises again and thus the switch SW5 is turned on. At this moment, the output voltage Vco of the inverter V1 is at a high level, and the output voltage PG2 of the latch circuit B1 remains unchanged at a high level. At this moment, since the intervention control pulse PG3 rises, the output voltage VcoG of the exclusive OR circuit N4 becomes a low level and the inputting of the output voltage Vco to the up-down counter UD1 is intercepted by the logical AND circuit N5.

Next, after the output voltage Vsig1 of the signal level is output to the vertical signal line V1in (time point t5) by the application of the read signal READn, the downward-slope of the second ramp wave VrampL is started and the reference clock CCK is input to the up-down counter UD1. In this case, since the output voltage Vco is not input to the up-down counter UD1, the up-down counter UD1 does not count down and thus the fourth sampling P4 of sampling the signal level of the signal level output from the pixel Pc is not likely to be performed.

Next, since the intervention control signal PG3 falls, the output voltage VcoG of the exclusive OR circuit N4 becomes a high level, and the output voltage Vco is input to the up-down counter UD1 via the logical AND circuit N5.

In this state, if the downward-slope of the first ramp wave VrampU is started and the reference clock CCK is input to the up-down counter UD1, the up-down counter UD1 counts up and the second sampling P2 of sampling the signal level of the signal output from the pixel PC is performed (time point t9).

Next (time point t10), if the downward-slope of the second ramp wave VrampL is started and the reference clock CCK is input to the up-down counter UD1, the up-down counter UD1 counts up and the third sampling P3 of sampling the signal level of the signal output from the pixel PC is performed (time point t11)

Figure 11:
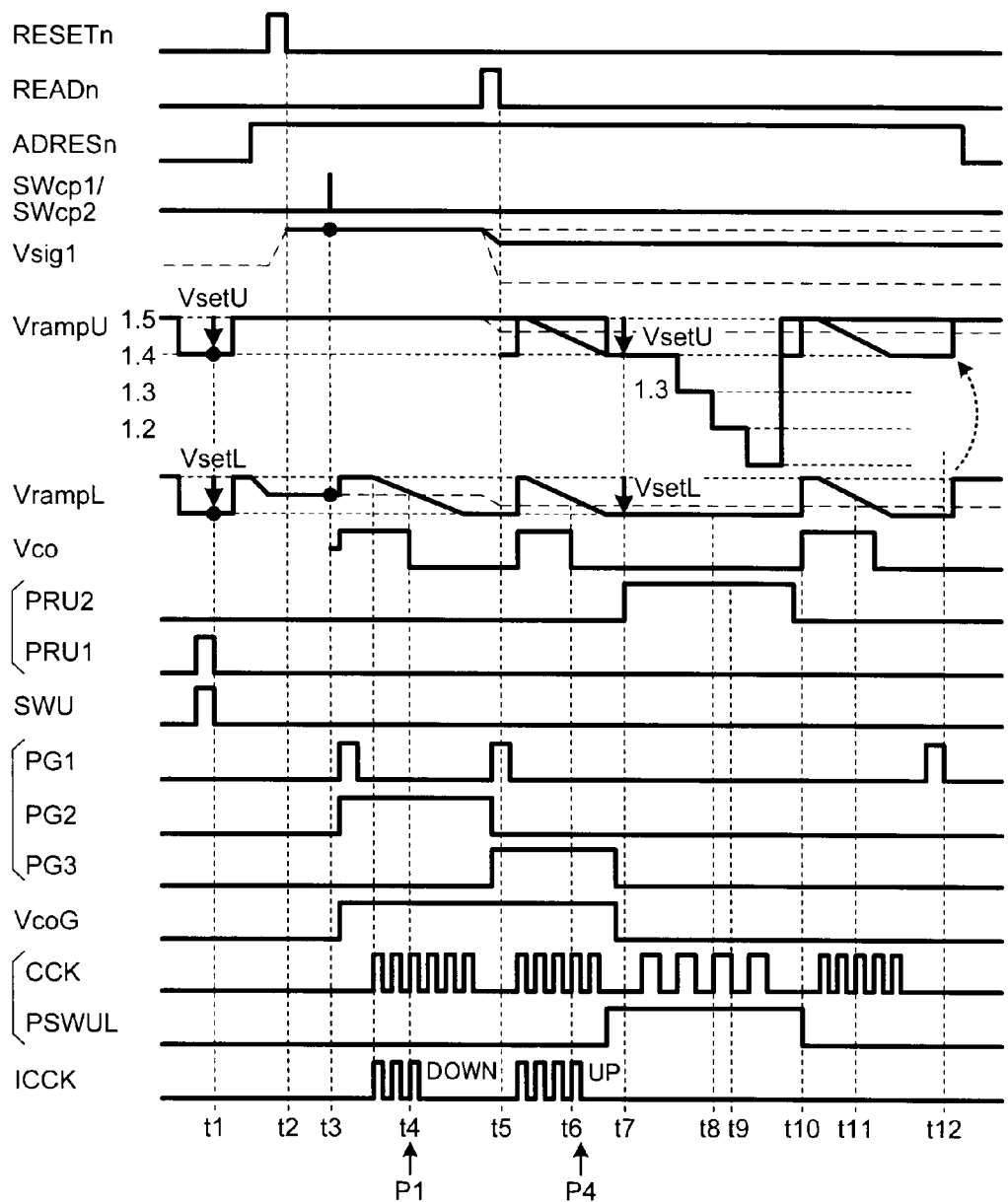
FIG. 11 is a timing chart illustrating waveforms of respective units of the solid state imaging device of FIG. 9 when a signal level is small.

FIG. 11 is a timing chart illustrating waveforms of respective units of the solid state imaging device of FIG. 9 when the signal level is small.

Referring to FIG. 11, if the first sampling P1 of sampling the reference level of the signal output from the pixel PC is performed (time point t4), and then the intervention signal PG1 rises, the switch SW5 is turned on. At this time, since the output voltage Vco of the inverter V1 is at a low level, the output voltage PG2 of the latch circuit transits to a low level. At this time, since the intervention control signal PG3 rises, the output voltage VcoG of the exclusive OR circuit N4 becomes a high level, and thus the output voltage Vco is input to the up-down counter UD1.

Next, The read signal READn is applied. Accordingly, the output voltage Vsig1 of the signal level is output to the vertical signal line V1in (time point t5) and then the downward-slope of second ramp wave VrampL is started. Further, the reference clock CCK is input to the up-down counter UD1, and thus the up-down counter UD1 counts up and the fourth sampling P4 of sampling the signal level of the signal output from the pixel PC is performed.

Next, the intervention control signal PG3 falls. Accordingly, the output voltage VcoG of the exclusive OR circuit N4 becomes a low level and the output voltage Vco is input to the up-down counter UD1. However, it is intercepted by the logical AND circuit N5. For such a reason, even if the reference clock CCK is input to the up-down counter UD1, the up-down counter UD1 does not count down and thus the sampling of the signal level of the signal output from the pixel PC is not performed.

The RTS noise currently at issue, which occurs in a source follower circuit of a pixel PCn, increases in noise amount as the frequency decreases. According to this exemplary embodiment, when the signal level of the signal output from a pixel PC is small, it is allowed to reduce the time interval between the timing of the first sampling of sampling the reference level and the timing of the fourth sampling of sampling the signal level as compared with the configuration of FIG. 3. For such a reason, in a case where the signal level of the signal output from a pixel PC is small, it is possible to reduce the RTS noise and thus the degradation in image quality is suppressed in the case of a small signal.

Fifth Exemplary Embodiment

Figure 12:
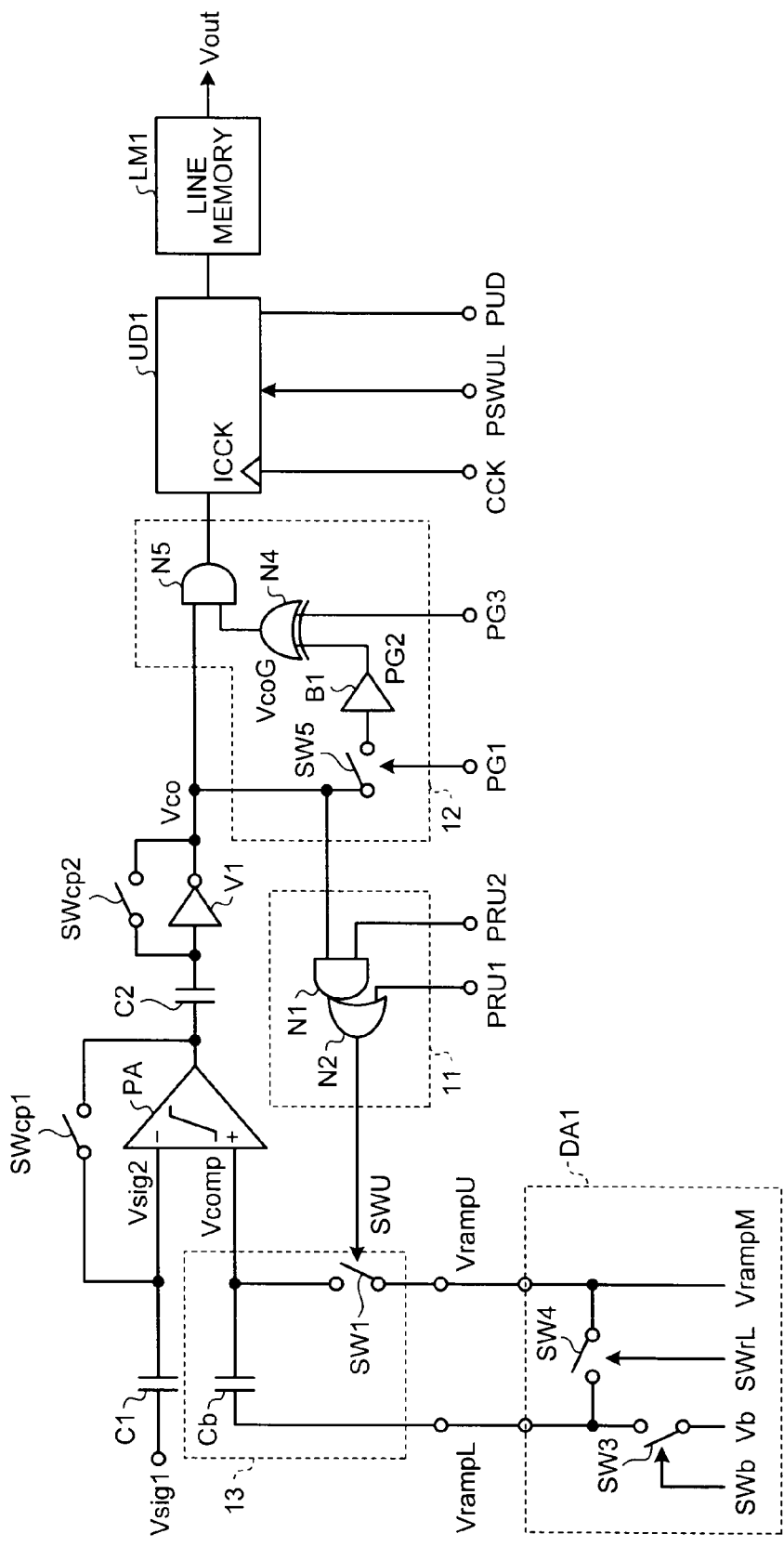
FIG. 12 is a block diagram illustrating a schematic configuration of a column ADC circuit applied to a solid state imaging device according to a fifth exemplary embodiment.

FIG. 12 is a block diagram illustrating a schematic configuration of a column ADC circuit applied to a solid state imaging device according to a fifth exemplary embodiment.

Referring to FIG. 12, the solid state imaging device further includes the reference ramp generating circuit DA1 shown in FIG. 6 as compared to the configuration of FIG. 9.

Figure 13:
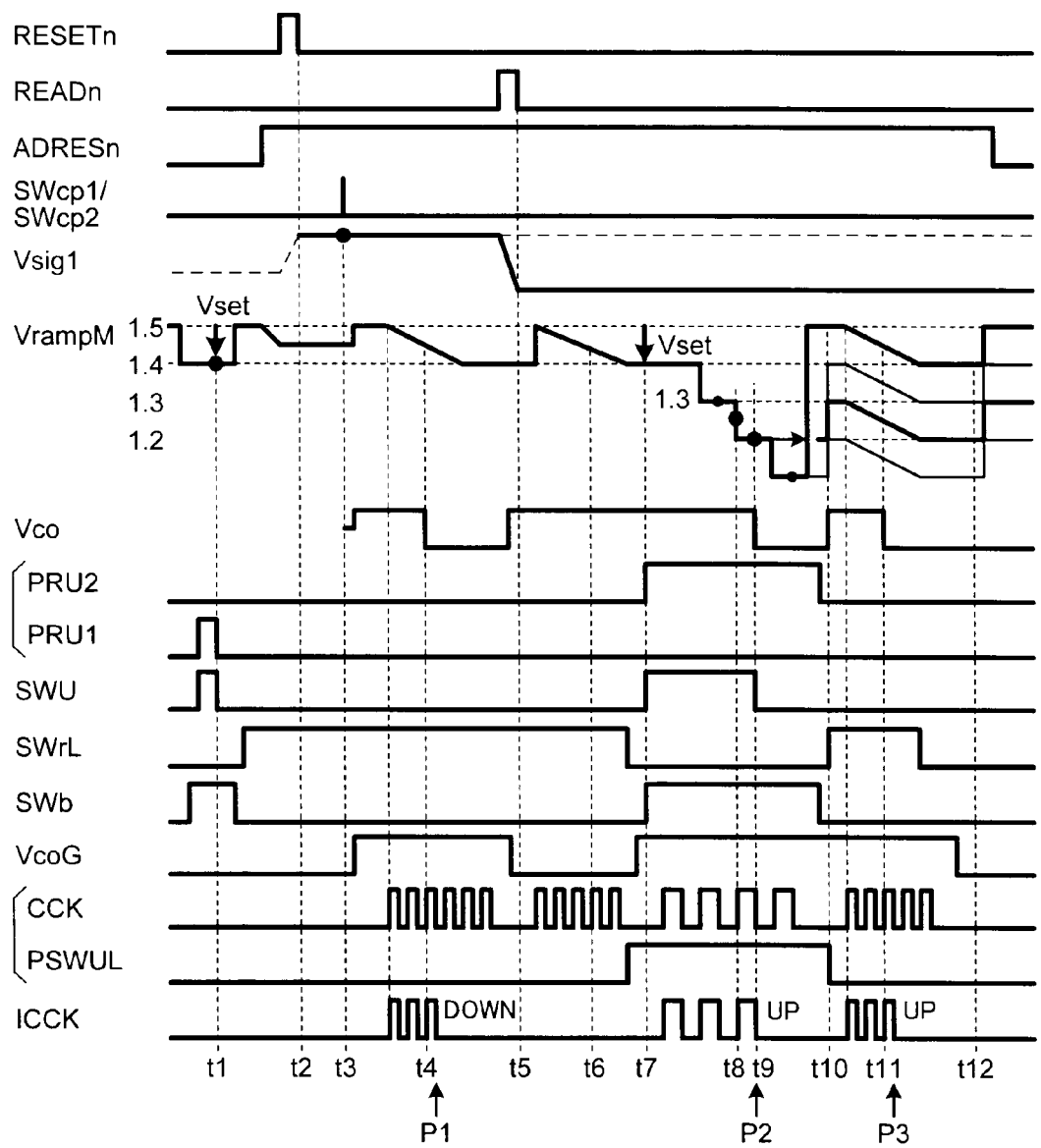
FIG. 13 is a timing chart illustrating waveforms of respective units of the solid state imaging device of FIG. 12 when a signal level is large.
Figure 14:
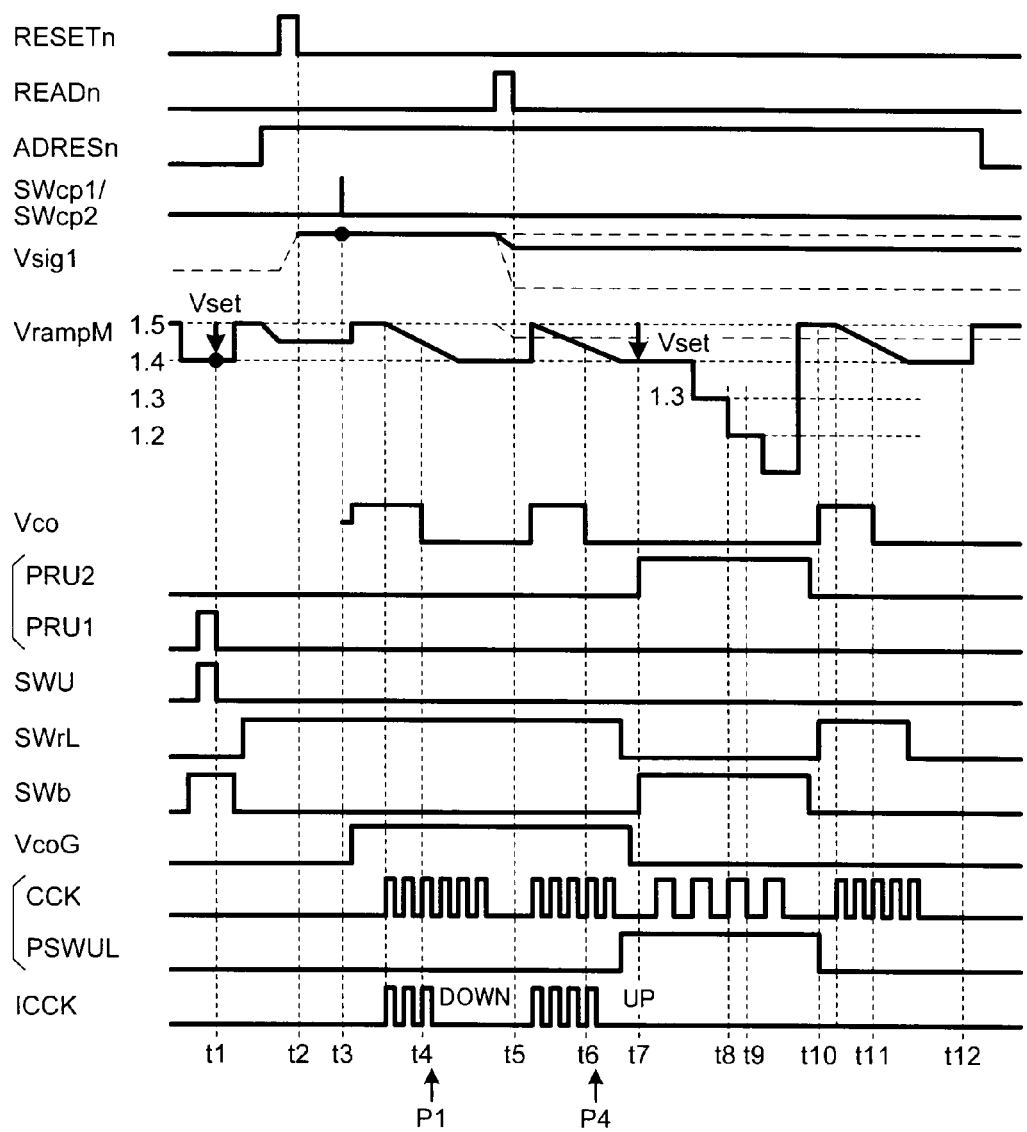
FIG. 14 is a timing chart illustrating waveforms of respective units of the solid state imaging device of FIG. 12 when a signal level is small.

FIG. 13 is a timing chart illustrating waveforms of respective units of the solid state imaging device shown in FIG. 12 when a signal level is large, and FIG. 14 is a timing chart illustrating waveforms of the respective units of the solid state imaging device shown in FIG. 12 when the signal level is small.

Referring to FIGS. 13 and 14, the fifth exemplary embodiment is different from the fourth exemplary embodiment in that the first ramp wave VrampU and the second ramp wave VrampL are individually provided in the forth exemplary embodiment, but a first ramp wave VrampU and a second ramp wave VrampL are generated from a ramp wave VrampM in the fifth exemplary embodiment.

Here, this timing chart of the solid state imaging device is similar to that obtained by combining the timing charts of FIGS. 10 and 11 with the switching signals SWrL and SWb of FIGS. 7 and 8.

Sixth Exemplary Embodiment

Figure 15:
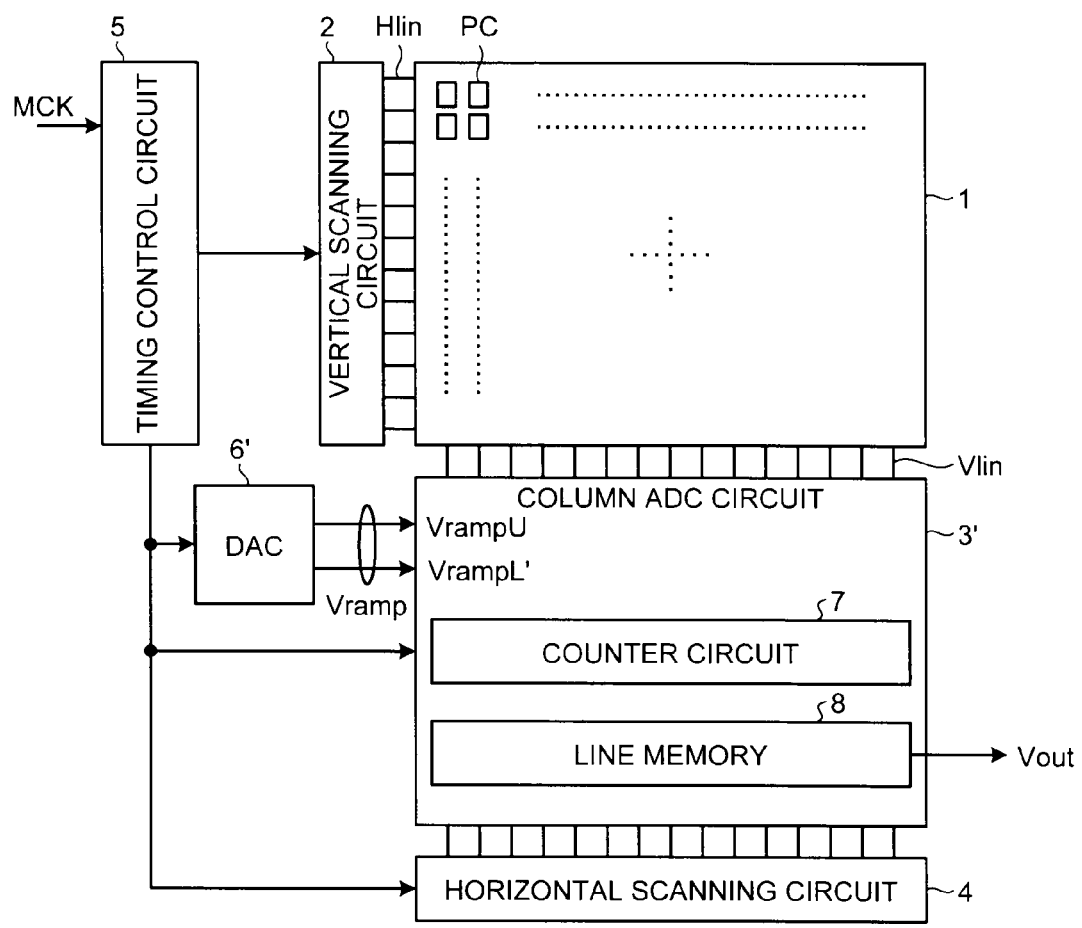
FIG. 15 is a block diagram illustrating a schematic configuration of a solid state imaging device according to a sixth exemplary embodiment.

FIG. 15 is a block diagram illustrating a schematic configuration of a solid state imaging device according to a sixth exemplary embodiment.

Referring to FIG. 15, the solid state imaging device includes a column ADC circuit 3' and a reference ramp generating circuit 6' instead of the column ADC circuit 3 and the reference ramp generating circuit 6. The reference ramp generating circuit 6' can generate a second ramp wave VrampL' where a plurality of slopes are repeatedly present. The column ADC circuit can perform the multiple sampling of the reference level and the signal level by repeatedly comparing the reference level and the signal level of the signal output from the pixel PC with the second ramp wave VrampL'.

Figure 16:
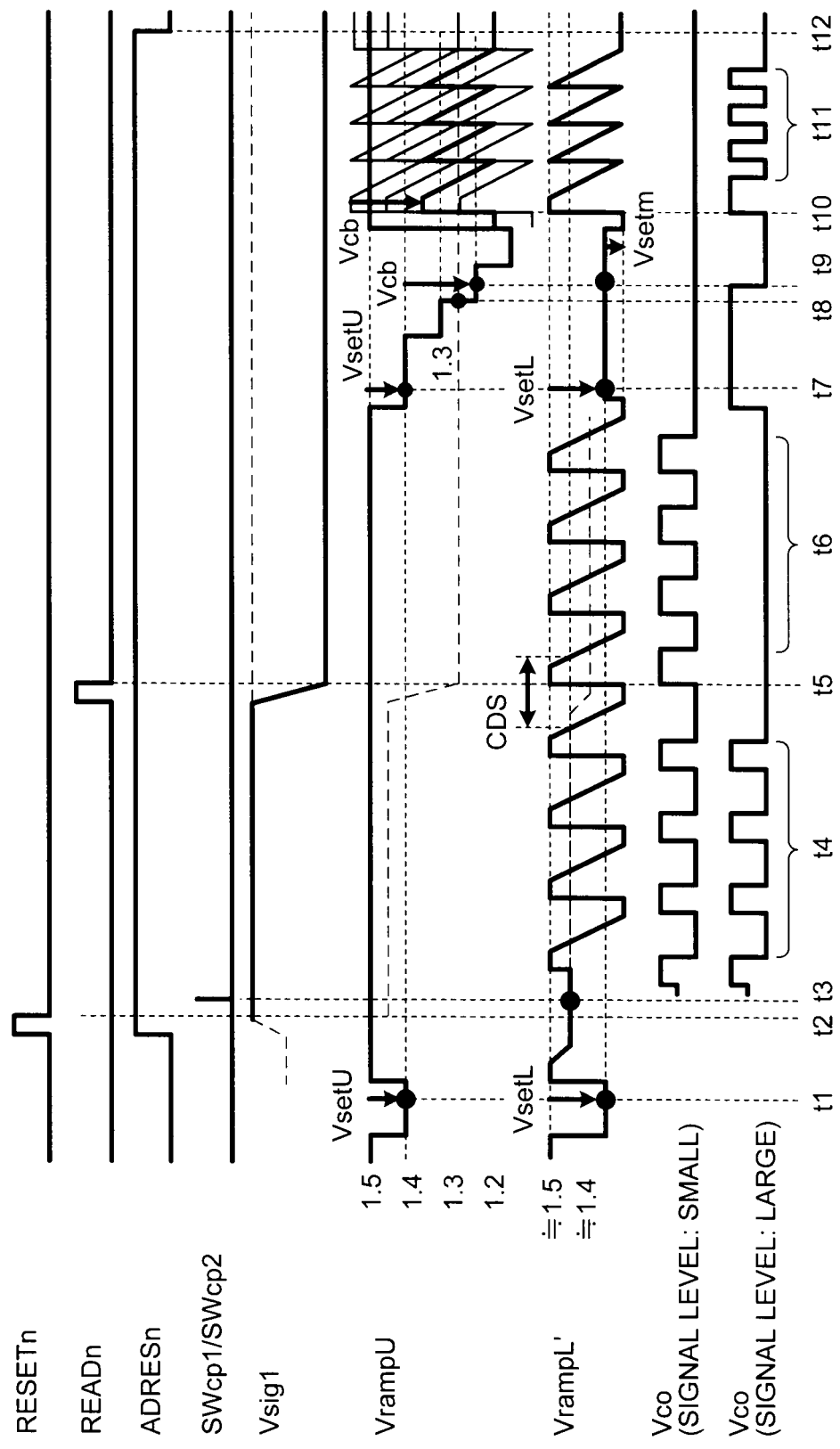
FIG. 16 is a timing chart illustrating waveforms of respective units of the solid state imaging device of FIG. 15.

FIG. 16 is a timing chart illustrating waveforms of respective units of the solid state imaging device of FIG. 15.

Referring to FIG. 16, in a case where a signal level is small, when a reset signal RESETn is applied to a pixel PCn, an output voltage Vsig1 of a reference level is applied to the vertical signal line V1in (time point t3), and then the downward-slope is present repeatedly in the second ramp wave VrampL' four times. Accordingly, the sampling of the reference level is performed four times (time point t4). At this time, the counter circuit 7 of FIG. 15 counts down four times with respect to the reference level per sampling and thus four down-count values for the reference level are integrated.

Next, if a read signal READn is input to the pixel PCn, the output voltage Vsig1 of a signal level is output to the vertical signal line V1in (time point t5), and then four downward-slopes are present in the second ramp wave VrampL'. Accordingly, the sampling of the signal level is performed four times (time point t6). At this time, the counter circuit 7 of FIG. 15 counts up four times with respect to the signal level per sampling. Accordingly, four up-count values for the signal level are integrated.

On the other hand, in a case where the signal level is large, if the reset signal RESETn is input to the pixel PCn, the output voltage Vsig1 of the reference level is output to the vertical signal line V1in (time point t3) and then four downward-slopes are present in the second ramp wave VrampL'. Accordingly, the sampling of the reference level is repeatedly performed four times (time point t4). At this time, the counter circuit 7 of FIG. 15 counts down four times for the reference level per sampling. Accordingly, four down-count values for the reference level are integrated.

Next, since the read signal READn is input to the pixel PCn, even if the output voltage Vsig1 of the signal level is output to the vertical signal line V1in (time point t5) and four downward-slopes are present in the second ramp wave VrampL', the sampling of the signal level is stopped (time point t6). At this time, the counter circuit of FIG. 15 does not perform the count operation.

Next, the downward-slope of the first ramp wave VrampU is started, and a first phase of coarse sampling of the signal level is performed (time point t9) and then four downward-slopes are present in the second ramp wave VrampL'. Accordingly, second phase of fine sampling of the signal level is performed fourth times (time point t11). At this time, the counter circuit 7 of FIG. 15 counts up four times per sampling of the signal level and thus up-count values of the signal level with respect to four sampling occurrences are integrated.

That is, this multiple sampling allows reduction in random noise. In a case where the signal level is small, the sampling can be performed without comparison between the signal level and the first ramp wave VrampU, and thus the intrusion and mixing of the KTC noise can be prevented.

According to the above-described exemplary embodiments, the description involves the cases where the number of sampling occurrences in the multiple sampling is set to four, but the number of sampling occurrences for the multiple sampling may be set to an arbitrary number.

For example, in a case where the number of sampling occurrences in the multiple sampling is four, the step height of the downward-slope of the second ramp wave VrampL' is increased four times as compared to the original step height. At every starting of the downward-slope in the second ramp wave VrampL', the start point may be shifted by the original step height.

By increasing, four times, the step height of the downward-slope of the second ramp wave VrampL' as compared to the original step height, the slope of the downward-slope of the second ramp wave VrampL' is increased and thus the AD conversion of the column ADC circuit 3' can be speeded up.

Furthermore, still in a case where the slope of the second ramp wave VrampL' is set in such a way of not degrading the resolution of the AD conversion of the column ADC circuit 3' by sequentially shifting the start points of the downward-slopes of the second ramp wave VrampL' by the original step height, it is possible to suppress the degradation of the resolution at the time of detection of the reference level and the signal level.

In a case of performing the second phase of fine sampling of the signal level, the amplitude of the downward-slope of the second ramp wave VrampL' may be set to be two times larger than that of the downward-slope of the first ramp wave VrampU, and the voltage Vsetm may be set such that the step of the downward-slope of the first ramp wave VrampU exists at the center portion of the amplitude of the downward-slope of the second ramp wave VrampL'. With such setting, at the time of performing the second phase of the fine sampling of the signal level, the multiple sampling can be executed, preventing the clipping of the signal.

In a case where the signal level is small, the interval between the sampling of the reference signal and the sampling of the signal level may be adjusted to match the time interval CDS (i.e., time interval in CDS) between the time of the last sampling of the reference level and the time of the last sampling of the signal level. With this, it is possible to reduce the RTS nose of the reference level and the signal level by the multiple sampling. For example, four sampling occurrences in the multiple sampling may reduce the RTS noise by half.

Seventh Exemplary Embodiment

Figure 17:
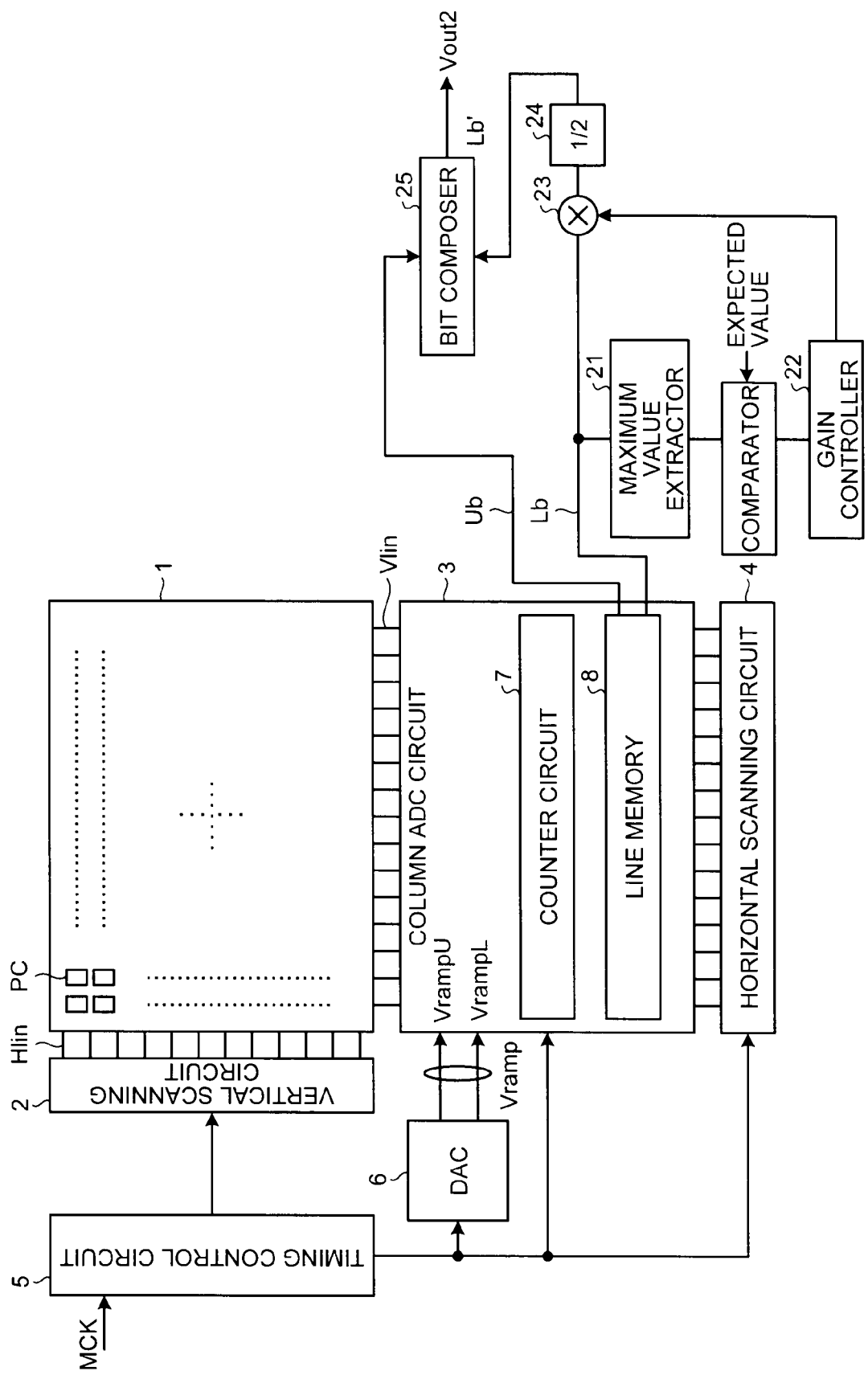
FIG. 17 is a block diagram illustrating a schematic configuration of a solid state imaging device according to a seventh exemplary embodiment.

FIG. 17 is a block diagram illustrating a schematic configuration of a solid state imaging device according to a seventh exemplary embodiment. Regarding outputs Ub and Lb of the line memory, the output signal of the lower counter UDL of the up-down counter UD1 in FIG. 3 is written in the line memory in a divided manner as the signal Lb. In the similar manner, the output signal of the upper counter UDU is written in the line memory in a divided manner as the signal Ub. At this time, the input signal to the upper counter UDU is directly input from the SW 11 excluding the SW 12.

Referring to FIG. 17, the solid state imaging device further includes a maximum value extractor 21, a gain controller 22, a multiplier 23, a divider 24, and a bit composer 25 as compared to the configuration of FIG. 1. The maximum value extractor 21 can extract a maximum value of the change in the signal level for the third sampling P3 of FIG. 4 under the test of the sensor. The gain controller 22 can control the gain of the signal level in the third sampling P3, on the basis of the result of the comparison between the maximum value extracted by the maximum value extractor 21 and the expected value of the change in the signal level of the third sampling P3. The gain controller 22 can set the gain such that the maximum value extracted by the maximum value extractor 21 matches an expected maximum value of the change in the signal level of the third sampling. The set data can be used as recorded in an EEPROM mounted in a sensor chip.

The multiplier 23 can multiply a lower bit Lb output from the column ADC circuit 3 by the gain under the control by the gain controller 22. The divider 24 can divide the output of the multiplier 23 by two (2). The bit composer 25 can combine the upper bit Ub output from the column ADC circuit 3 and the lower bit Ub' output from the divider 24, and outputs the results as the output data Vout 2. When the amplitude of the ramp wave VrampL is smaller than the width of one step of the ramp wave VrampU is, the divider 24 may not be incorporated.

Figure 18:
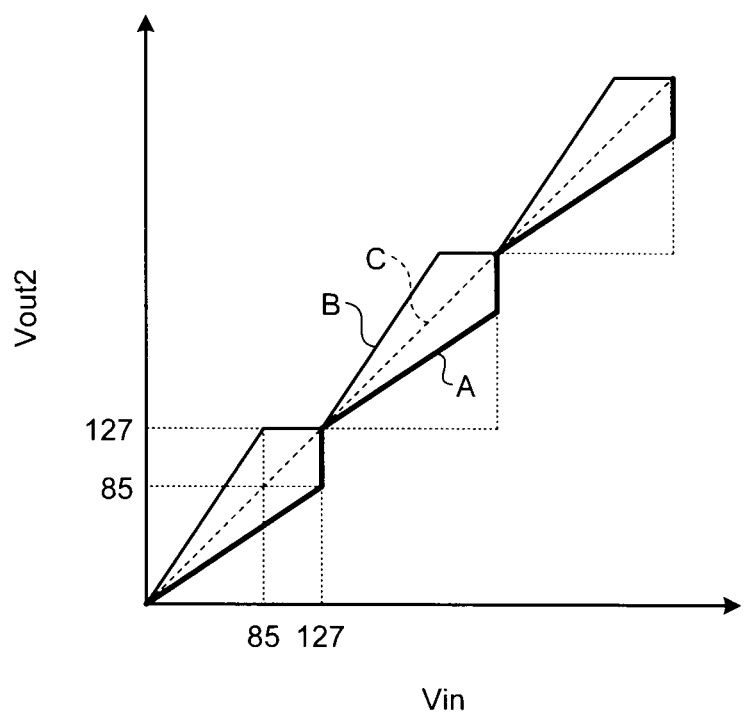
FIG. 18 is a diagram illustrating the relationship between an input signal and an output signal of the solid state imaging device of FIG. 17.

FIG. 18 is a diagram illustrating the relationship between the input signal and the output signal of the solid state imaging device of FIG. 17. C is the ideal relationship between the input signal and the output signal. A is the relationship between the input signal and the output signal in a case where the amplitude of the signal input to the non-inverted input terminal of the comparator PA of FIG. 3 is smaller than the amplitude of the second ramp wave VrampL. B is the relationship between the input signal and the output signal in a case where the amplitude of the signal input to the non-inverted input terminal of the comparator PA of FIG. 3 is larger than the amplitude of the second ramp wave VrampL.

Referring to FIG. 18, in the comparator PA of FIG. 3, the first ramp wave VrampU is directly input to the non-inverted input terminal, and the second ramp wave VrampL is input to the non-inverted input terminal via the condenser Cb. At this time, the parasitic capacitance exists in the inverted input terminal of the comparator PA, and this parasitic capacitance reduces the effective amplitude of the second ramp wave VrampL. For example, if the capacitance of the condenser Cb is 100 fF and the parasitic capacitance between glands is 10 fF, the amplitude of the second ramp wave VrampL is reduced to 91% when it is input to the comparator PA, and thus the solid state imaging device has the relationship A between the input signal and the output signal. The parasitic capacitance varies depending on units because of the process variations.

That is, in the relationship A, since the resolution of the second phase of AD conversion of the signal level is very coarse as compared to the minimum resolution of the first phase of AD conversion of signal level, the count ends in the middle of conversion, unsatisfying the relationship C. For example, there may be a case where the input signal includes 127 digital values but only 85 counts are executed and outputted as the digital outputs after the AD conversion. Immediately after that, 128 digital values are output as the next level of the resolution of the first phase of AD conversion.

In the relationship B, the count of the second phase of AD conversion ends earlier as compared to the minimum resolution of the first phase of AD conversion of the signal level. For example, when the original input signal includes 85 digital values, the digital outputs after the AD conversion are 127 counts. Accordingly, when the input signal includes a certain number of digital values in the range of 85 to 127, digital outputs are 127 counts.

Accordingly, in the solid state imaging device of FIG. 17, it is possible to correct the relationship of the solid state imaging device from the relationship A to the relationship C by detecting the decrease amount of the amplitude of the second ramp wave VrampL and compensating for the decrease amount of the amplitude.

For example, the maximum digital value of the lower bit Lb output from the column ADC circuit 3 is 85, and the expected maximum value of the change in the signal level is 127, the gain is set to 1.5 (127/85=1.5) by the gain controller 22.

Next, the gain set by the gain controller 22 is multiplied by the lower bit Lb in the multiplier 23, and then the resultant is divided by two in the divider 24, to produce the lower bit Lb'. Then, the produced lower bit Lb' is combined with the upper bit Ub output from the column ADC circuit 3, to generate the output data Vout 2. Furthermore, for example, the upper bit Ub and the lower bit Lb may be respectively 6 bits, and the lower bit Lb' may be 5 bits.

Accordingly, even in a case where the input signal and the output signal of the column ADC circuit 3 are in the relationship A due to the parasitic capacitance of the comparator PA, it is possible to correct the relationship between the input signal and the output signal of the solid state imaging device to the relationship C.

Eighth Exemplary Embodiment

Figure 19:
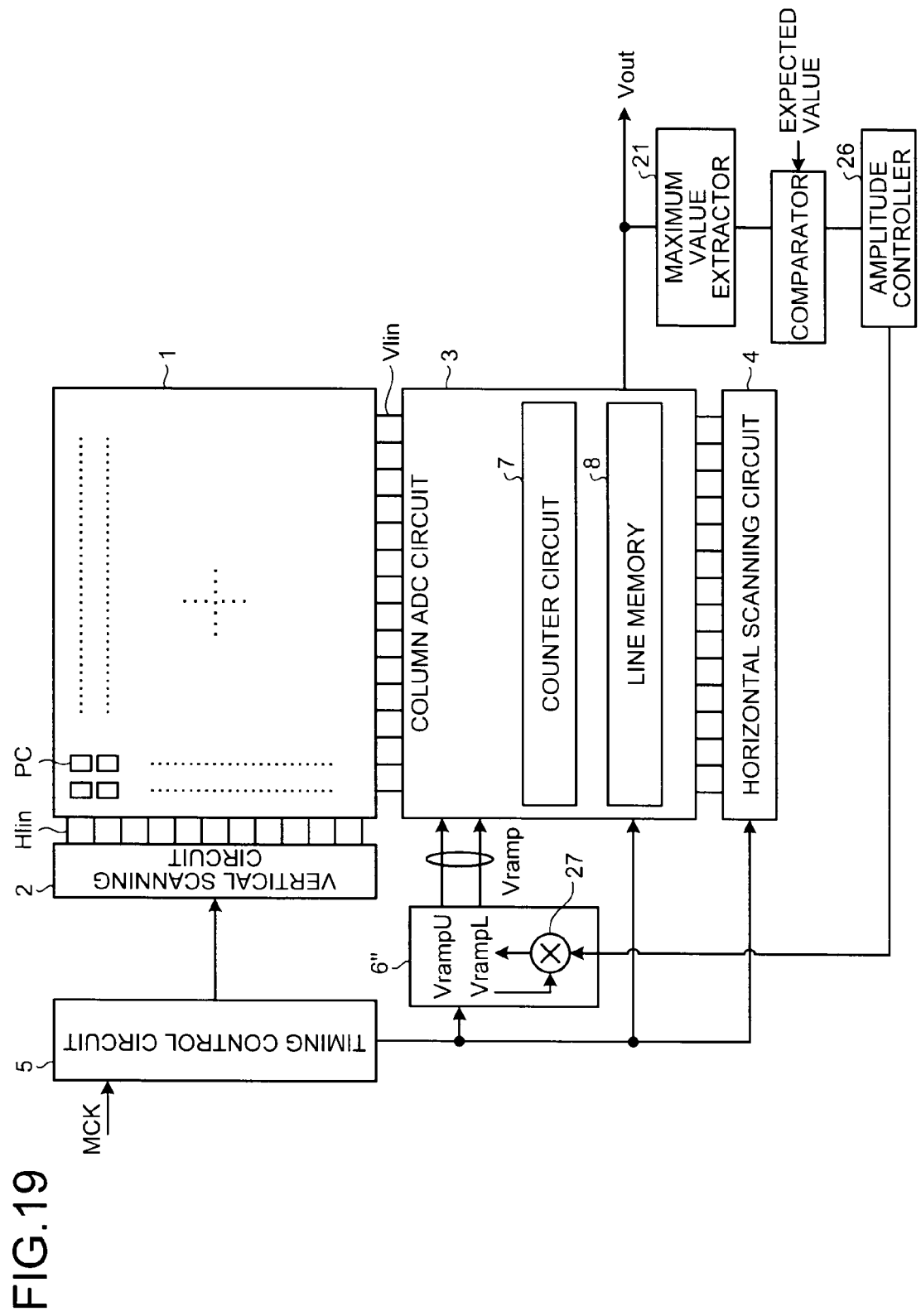
FIG. 19 is a block diagram illustrating a schematic configuration of a solid state imaging device according to an eighth exemplary embodiment.

FIG. 19 is a block diagram illustrating a schematic configuration of a solid state imaging device according to an eighth exemplary embodiment.

Referring to FIG. 19, the solid state imaging device further includes a maximum value extractor 21 and an amplitude controller 26 as compared to the configuration of FIG. 1. It also includes a reference ramp generating circuit 6" instead of the reference ramp generating circuit 6 of FIG. 1.

The amplitude controller 26 can control the amplitude of the second ramp wave VrampL on the basis of the result of the comparison between the maximum value extracted by the maximum value extractor 21 under the test of a sensor and the expected value of the change in the signal level at the time of the third sampling P3. The amplitude controller 26 can control the gain such that the maximum value extracted by the maximum value extractor 21 matches the expected maximum value of the change in the signal level at the time of the third sampling P3. This setting can be used as recorded in an EEPROM mounted in a sensor.

The reference ramp generating circuit 6" can correct the amplitude of the second ramp wave VrampL on the basis of the gain set by the amplitude controller 26. Here, the reference ramp generating circuit 6" may be provided with a multiplier 27 that multiplies the gain set by the amplitude controller 26 by the second ramp wave VrampL.

For example, when the maximum digital value of the lower bit Lb output from the column ADC circuit 3 is 85, and the expected maximum value of the change in the signal level is 127, the gain is set to 1.5 (that is, 127/85=1.5) by the amplitude controller 26.

Next, the gain set by the multiplier 27 is multiplied by second ramp wave VrampL, and is then output to the column ADC circuit 3.

As a result, still in the case where the second ramp wave VrampL is applied to the non-inverted input terminal of the comparator PA via the condenser Cb, and the effective amplitude of the second ramp wave VrampL is reduced due to the parasitic capacitance of the comparator PA, the relationship C can be established between the input signal and the output signal of the column ADC circuit 3.

Ninth Exemplary Embodiment

Figure 20:
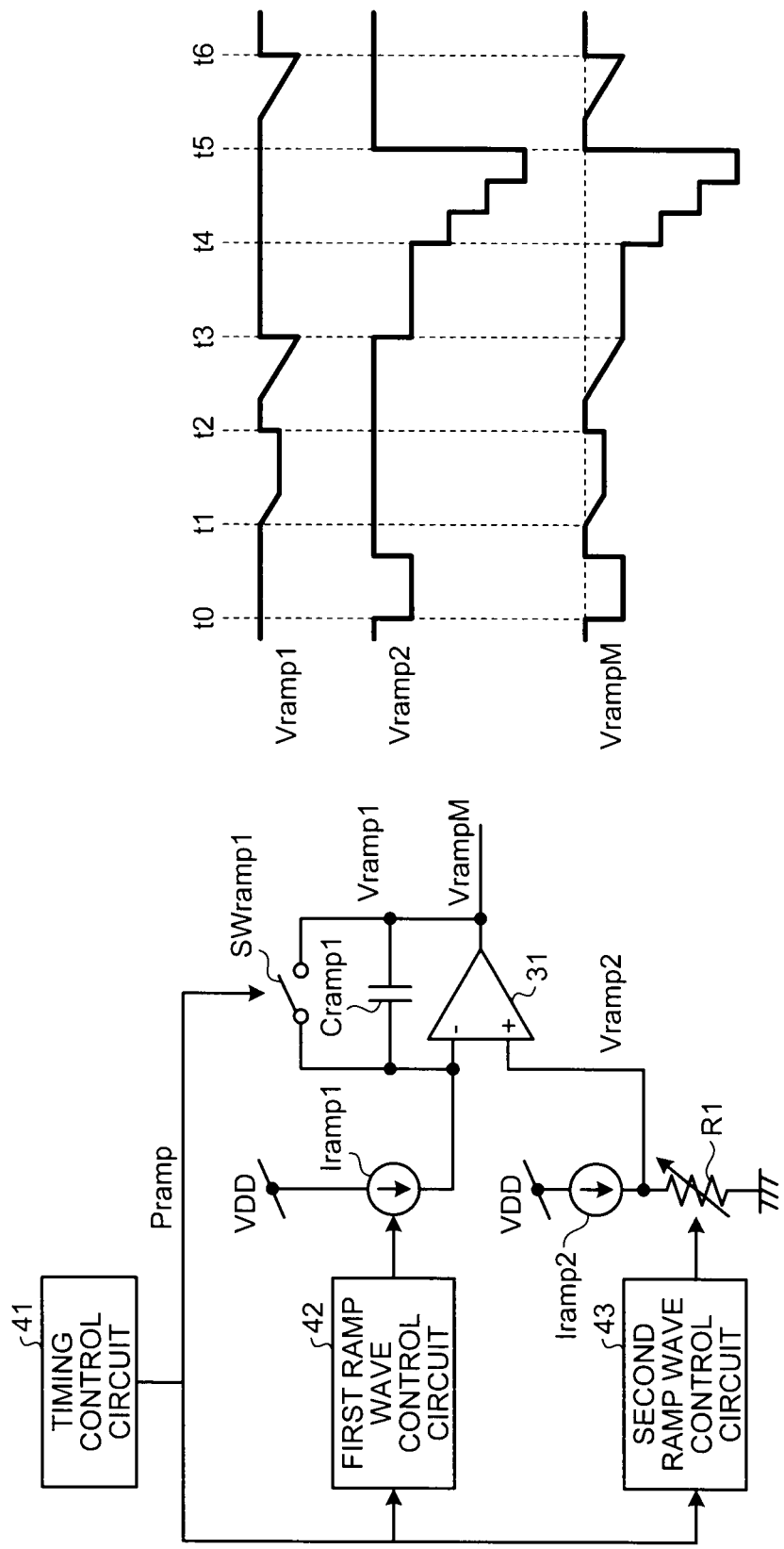
FIG. 20 is a block diagram illustrating a schematic configuration of a reference ramp generating circuit according to a ninth exemplary embodiment.

FIG. 20 is a block diagram illustrating a schematic configuration of a reference ramp generating circuit according to a ninth exemplary embodiment.

FIG. 20 shows an example of using an operating amplifier (OM AMP) 31 as a method of generating a ramp wave VrampM output from a reference ramp generating circuit.

An inverted input terminal of the OP AMP 31 is connected to a constant current source circuit Iramp1. The output of the OP AMP 31 is connected to the inverted input terminal via the switch SWramp1. Furthermore, the output of the OP AMP 31 is also connected to the inverted input terminal via the condenser Cramp1.

The switch SWramp1 suppresses the generation of the first ramp wave Vramp1 with use of the output pulse Pramp of the timing control circuit 41. The slope of the first ramp wave Vramp1 can be changed by the control of the current amount of the constant current source circuit Iramp1 and the capacitance of the condenser Cramp1. The amplitude of the first ramp wave Vramp1 can be changed by controlling the current amount of the constant current source circuit Iramp1 with use of the first ramp control circuit 42. When the non-inverted input terminal of the OP AMP 31 has a direct current voltage, it is possible to generate the waveform with the shown slope for the first ramp wave Vramp1.

A predetermined voltage, 1.5 V, is generated and is then input to the non-inverted input terminal of the OP AMP 31. The voltage is applied with a bias voltage generated by the constant current source circuit Iramp2 and a resistor R1. The same voltage, 1.5 V, as an input voltage is present in the ramp wave VrampM output from the output terminal of the OP AMP. At this time, if the switch SWramp1 is turned on, a negative input voltage is also set to 1.5 V.

If the switch SWramp1 is turned off, the current generated from the constant current source circuit Iramp1 flows in the condenser Cramp1. Since the non-inverted input terminal and the inverted input terminal of the OP AMP 31 remain at the same voltage, the output voltage thereof changes. Since the constant current flows from the constant current source circuit Iramp1, the first ramp wave Vramp1 having the constant slope is generated at times.

At times t0, t3, and t4, the value of the resistor R1 is increased with the second ramp control circuit 43. Then, the bias voltage of the second ramp wave Vramp2 changes and thus a step-shaped second ramp wave Vramp2 is generated.

At the output terminal of the OP AMP 31, the ramp wave VrampM, which is the combination of the second ramp wave Vramp2 and the first ramp wave Vramp1, can be generated. The first ramp wave control circuit 42 and the second ramp wave control circuit 43 can perform a control in synchronization with the timing control circuit 41.

The waveform of the second ramp wave Vramp2 can be generated by incorporating two reference ramp generating circuits and using the direct current voltage for the first ramp wave Vramp1. This waveform can be output as the first ramp wave VrampU. Another circuit can generate the waveform of the first ramp wave Vramp1 by using the direct current voltage for the second ramp wave Vramp2. This waveform can be output as the second ramp wave VrampL.

Other Embodiments

The digital CDS operation may use an addition circuit (BW1 counter circuit) using two complements. Furthermore, it is possible to implement the digital CDS operation by using only an up counter instead of the up-down counter, separately storing the data of the reference level and the data of the signal level, and taking a differential between these data. As the switch, an N-channel field effect transistor, a p-channel field effect transistor, or a CMOS switch may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid state imaging device comprising:
pixels that output photoelectrically converted signals and are arranged two-dimensionally;
a reference ramp generating circuit that generates a plurality of ramp waves for use in an AD conversion of pixel signals output from the pixels;
a plurality of comparator circuits, each being arranged in a column and comparing the pixel signal received by one input terminal with the ramp wave received by another input terminal;
a counter circuit that converts a change in an output signal of the comparator circuit into a digital value; and
a ramp wave selection circuit and a ramp wave selection control circuit that select a plurality of ramp waves to be supplied to the comparator circuits,
a column ADC circuit which performs an AD conversion by using only the second ramp wave or by switching between the first ramp wave and the second ramp wave in accordance with the signal level of the signal output from the pixel,
wherein the ramp wave selection control circuit includes a first pulse generating unit which controls the ramp wave selection circuit according to the level of the pixel signal, wherein the reference ramp generating circuit includes:
a first ramp wave generating circuit that generates a first ramp wave; and
a second ramp wave generating circuit that generates a second ramp wave having a step width smaller than that of the first ramp wave,
and wherein the column ADC circuit performs the AD conversion by switching between the first ramp wave and the second ramp wave in a case where the signal level of the signal output from the pixel exceeds a predetermined value, but performs the AD conversion by selecting only the second ramp wave in a case where the signal level of the signal output from the pixel is equal to or less than the predetermined value.

2. The solid state imaging device according to claim 1, wherein the lamp wave selection circuit controls a switch circuit such that a first ramp wave is transmitted to one end of a condenser and thus is supplied to the comparator circuit and a second ramp wave is supplied from the other end of the condenser to the comparator circuit.

3. The solid state imaging device according to claim 2, wherein the ramp wave selection control circuit receives the output signal of the comparator circuit and generates a control signal that is able to perform a control of turning on and off the switch circuit.

4. The solid state imaging device according to claim 2, wherein the ramp wave selection control circuit receives the output signal of the comparator circuit and generates a second pulse that performs a control of enabling and disabling the input signal.

5. The solid state imaging device according to claim 1, wherein the counter circuit further includes an upper-lower bit selection circuit to selectively receive an upper-level bit and a lower-level bit of the output signal of the comparator circuit.

6. The solid state imaging device according to claim 1, wherein the reference ramp generating circuit includes:
a ramp wave generating circuit that generates a third ramp wave resulting from the combination of the first ramp wave and the second ramp wave;
a direct current voltage generating circuit that generates a direct current voltage; and
a switch that switches between a state in which the third ramp wave is input to the other input terminal of the comparator and a state in which a voltage obtained by superimposing the direct current voltage on the ramp wave via a capacitor is input to the other input terminal of the comparator.

7. The solid state imaging device according to claim 1, wherein the reference ramp generating circuit generates the second ramp wave in a manner such that a plurality of slopes are repeatedly present, and
wherein the column ADC circuit repeatedly compares the second ramp wave with the signal level to perform multiple sampling.

8. The solid state imaging device according to claim 1, further comprising a line memory that stores digital data counted by the counter circuit.

9. The solid state imaging device according to claim 8, further comprising:
a maximum value extractor that extracts a maximum value of a change in the signal level that is AD-converted with use of the second ramp wave; and
a gain controller that controls a gain of the signal level that is AD-converted using the second ramp wave, on the basis of the result of a comparison between the maximum value extracted by the maximum value extractor and an expected maximum value to be obtained from the AD conversion using the second ramp wave.

10. The solid state imaging device according to claim 9, wherein the reference ramp generating circuit makes a maximum amplitude of the second ramp wave larger than a amplitude of a step of the second ramp wave.

11. The solid state imaging device according to claim 8, further comprising:
a maximum value extractor that extract a maximum value of a change of the signal level that is AD-converted with use of the second ramp wave; and
an amplitude controller that controls an amplitude of the second ramp wave, on the basis of the result of a comparison between the maximum value extracted by the maximum value extractor and an expected maximum value to be obtained from the AD-conversion using the second ramp wave.

12. A solid state imaging device comprising:
pixels that output photoelectrically converted signals and are two-dimensionally arranged;
a reference ramp generating circuit that generates a first ramp wave for use in coarse AD conversion of pixel signals output from the pixels and a second ramp wave for use in fine AD conversion of pixel signals output from the pixels;
a plurality of comparator circuits, each being arranged in a column and comparing the pixel signal with the ramp wave;
a counter circuit that converts a change in an output signal of the comparator circuit into a digital value;
a ramp wave selection circuit that select the first ramp wave or the second ramp wave to be supplied to the comparator circuits; and
a counter intervention control circuit that intercepts one of the output signals of the comparator circuits to become an input signal to be input to the counter circuit,
wherein the second ramp wave is generated before and after the first ramp wave, and compared with the pixel signal respectively, and the comparison result is output respectively.

13. The solid stage imaging apparatus according to claim 12, further comprising a counter intervention control circuit that receives each of the output signals of the comparator circuits, and controls the output signals of the comparator circuits to be input to the counter circuit with a logic circuit of the output signals of the comparator circuits and the counter intervention control pulse that is input.

14. The solid state imaging device according to claim 12, wherein the counter intervention control circuit controls the output signals of the comparator circuits of the counter circuit with use of a latch circuit that holds each of the level of the output signals of the comparator circuits and a logic circuit of the output signal of the latch circuit and the counter intervention control pulse that is input.

* * * * *